(12) United States Patent
Jen et al.

(10) Patent No.: US 7,749,408 B2
(45) Date of Patent: Jul. 6, 2010

(54) ELECTRO-OPTIC DENDRIMER-BASED GLASS COMPOSITES

(75) Inventors: Kwan-Yue Jen, Kenmore, WA (US); Jingdong Luo, Seattle, WA (US); Tae-Dong Kim, Seattle, WA (US); Baoquan Chen, Bothell, WA (US); Jae-Wook Kang, Gyeongsangnam-do (KR); Philip A. Sullivan, Seattle, WA (US); Andrew Akelaitis, Seattle, WA (US); Larry R. Dalton, Silverdale, WA (US); Yen-Ju Cheng, Seattle, WA (US)

(73) Assignee: University of Washington, Seattle, WA (US)

( * ) Notice: Subject to any disclaimer, the term of this patent is extended or adjusted under 35 U.S.C. 154(b) by 367 days.

(21) Appl. No.: 11/462,339

(22) Filed: Aug. 3, 2006

(65) Prior Publication Data

US 2007/0152198 A1    Jul. 5, 2007

Related U.S. Application Data

(63) Continuation-in-part of application No. 11/335,834, filed on Jan. 18, 2006, now abandoned.

(60) Provisional application No. 60/644,960, filed on Jan. 18, 2005, provisional application No. 60/646,321, filed on Jan. 21, 2005.

(51) Int. Cl.
*F21V 9/00* (2006.01)
*G02B 5/02* (2006.01)
*G02C 7/10* (2006.01)
*G02F 1/361* (2006.01)
*G03B 11/00* (2006.01)

(52) U.S. Cl. ............ 252/582; 548/202; 548/206; 548/327; 548/400; 548/527; 549/60; 549/474

(58) Field of Classification Search ............ 252/482, 252/582; 525/276, 282, 242, 245, 246, 262; 528/170; 549/474, 60; 548/400, 202, 206, 548/527, 327
See application file for complete search history.

(56) References Cited

U.S. PATENT DOCUMENTS

| 5,290,630 | A | 3/1994 | Devonald |
| 5,708,178 | A | 1/1998 | Ermer |
| 5,911,018 | A | 6/1999 | Bischel |
| 6,049,641 | A | 4/2000 | Deacon |
| 6,067,186 | A | 5/2000 | Dalton |
| 6,090,332 | A | 7/2000 | Marder |
| 7,014,796 | B2 | 3/2006 | Jen |
| 7,029,606 | B2 | 4/2006 | Dalton |
| 7,144,960 | B2 | 12/2006 | Jen |
| 2002/0084446 | A1 | 7/2002 | Dalton |
| 2003/0092869 | A1 | 5/2003 | Yu |

FOREIGN PATENT DOCUMENTS

WO    WO 2004/065615 A2 *    8/2004

OTHER PUBLICATIONS

Ma, Hong; Liu, Sen; Luo, Jingdong; Suresh, S.; Liu, Lu; Kang, Seok Ho; Haller, Marnie; Sassa, Takafumi; Dalton, Larry R.; Jen, Alex K.-Y. Highly efficient and thermally stable electro-optical dendrimers for photonics,Advanced Functional Materials (2002), 12(9), 565-574, Wiley-VCH Verlag GmbH & Co. KGaA.*
Chemical reaction pamphlet (Wikipedia, the free encyclopedia), http://en.wikipedia.org/wiki/Chemical_reactor Aug. 17, 2009.*
Chen, X., et al., "A Thermally Re-Mendable Cross-Linked Polymeric Material," Science 295(5560):1698-1702, Mar. 1, 2002.
Goussé, C., et al., "Application of Diels-Alder Reaction to Polymers Bearing Furan Moieties. 2. Diels-Alder and Retro-Diels-Alder Reactions Involving Furan Rings in Some Styrene Copolymers," Macromolecules 31(2):314-321, 1998.É.
Kwart, H., and Kenneth King, "The Reverse Diels-Alder or Retrodiene Reaction," Chemical Reviews 68(4):415-447, 1968.
McElhanon, J.R., and D.R. Wheeler, "Thermally Responsive Dendrons and Dendrimers Based on Reversible Furan-Maleimide Diels-Alder Adducts," Organic Letters 3(17):2681-2683, 2001.

* cited by examiner

*Primary Examiner*—Ling-Siu Choi
*Assistant Examiner*—Bijan Ahvazi
(74) *Attorney, Agent, or Firm*—Christensen O'Connor Johnson Kindness PLLC

(57) ABSTRACT

A composite having electro-optic activity including a chromophore compound dispersed in a host material comprising a dendronized chromophore compound, methods for making the composite, and electro-optic devices including the composite.

12 Claims, 28 Drawing Sheets

AJC146

AJC168

PSLD_57

$C_{176}H_{141}F_9N_{12}O_{27}S_3$
Exact Mass: 3120.90

PSLD_85

$C_{188}H_{141}F_9N_{12}O_{36}S_3$
Exact Mass: 3408.86

AALD_1179

$C_{59}H_{45}F_3N_6O_{11}S_2$
Exact Mass: 1134.25

PAS_92

$C_{41}H_{33}N_3O_{12}$
Exact Mass: 759.21

ELECTRO-OPTIC DENDRIMER-BASED GLASS COMPOSITES

CROSS-REFERENCES TO RELATED APPLICATIONS

This application is a continuation-in-part of U.S. patent application Ser. No. 11/335,834, filed Jan. 18, 2006, which claims the benefit of U.S. Provisional Application No. 60/644,960, filed Jan. 18, 2005, and U.S. Provisional Application No. 60/646,321, filed Jan. 21, 2005, each expressly incorporated herein by reference in its entirety.

STATEMENT OF GOVERNMENT LICENSE RIGHTS

This invention was made with government support under Contract Number N00014-04-1-0094, awarded by the United States Navy. The government has certain rights in the invention.

BACKGROUND OF THE INVENTION

Electrical signals can be encoded onto fiber-optic transmissions by electro-optic modulators. These modulators include electro-optic materials having highly polarizable electrons. When these materials are subject to an electric field, their polarization changes dramatically resulting in an increase in the index of refraction of the material and an accompanying decrease in the velocity of light traveling through the material. This electric field-dependent index of refraction can be used to encode electric signals onto optical signals. Uses include, for example, switching optical signals and steering light beams.

A variety of electro-optic materials have been utilized for use in electro-optic devices. Among these materials are inorganic materials such as lithium niobate, semiconductor materials such as gallium arsenide, organic crystalline materials, and electrically poled polymer films that include organic chromophores. A review of nonlinear optical materials is provided in L. Dalton, "Nonlinear Optical Materials," *Kirk-Othmer Encyclopedia of Chemical Technology*, 4$^{th}$ ed., Vol. 17 John Wiley & Sons, New York, pp. 288-302 (1995).

In contrast to inorganic materials in which polar optical lattice vibrations diminish effectiveness, the optical properties of organic nonlinear optical materials depend primarily on the hyperpolarizability of their electrons without a significant adverse contribution from the lattice polarizability. Thus, organic nonlinear optical materials offer advantages for ultrafast electro-optic modulation and switching.

Lithium niobate, a common material currently utilized in electro-optic devices, has an electro-optic coefficient of about 35 pm/V resulting in a typical drive voltage of about 5 volts. Drive voltage ($V_\pi$) refers to the voltage that produces a $\pi$ phase shift of light. Lithium niobate has a high dielectric constant ($\in$=28), which results in a mismatch of electrical and optical waves propagating in the material. The mismatch necessitates a short interaction length, which makes drive voltage reduction through increasing device length unfeasible, thereby limiting the device's bandwidth. Recent lithium niobate modulators have been demonstrated to operate at a bandwidth of over 70 GHz.

Electro-optic poled polymers have also been utilized as modulating materials. Their advantages include their applicability to thin-film waveguiding strictures, which are relatively easily fabricated and compatible with existing microelectronic processing. These polymers incorporate organic nonlinear optically active molecules to effect modulation. Because organic materials have low dielectric constants and satisfy the condition that $n^2=\in$, where n is the index of refraction and $\in$ is the dielectric constant, organic electro-optic will have wide bandwidths. The dielectric constant of these materials ($\in$=2.5-4) relatively closely matches the propagating electrical and optical waves, which provides for a drive voltage in the range of about 1-2 volts and a bandwidth greater than 100 GHz.

Advantages of organic nonlinear optical materials include a bandwidth in excess of 100 GHz/cm device and ease of integration with semiconductor devices. See L. Dalton et al., "Synthesis and Processing of Improved Organic Second-Order Nonlinear Optical Materials for Applications in Photonics," *Chemistry of Materials*, Vol. 7, No. 6, pp. 1060-1081 (1995). In contrast to inorganic materials, these organic materials can be systematically modified to improve electro-optic activity by the design and development of new organic materials and by the development of improved processing methods. See L. Dalton et al., "The Role of London Forces in Defining Noncentrosymmetric Order of High Dipole Moment-High Hyperpolarizability Chromophores in Electrically Poled Polymeric Films," *Proceedings of the National Academy of Sciences USA*, Vol. 94, pp. 4842-4847 (1997).

For an organic nonlinear optical material to be suitable for electro-optic applications, the material should have a large molecular optical nonlinearity, referred to as hyperpolarizability ($\beta$), and a large dipole moment ($\mu$). A commonly figure of merit used to compare materials is the value $\mu\beta$. Organic materials having $\mu\beta$ values greater than about $15,000 \times 10^{-48}$ esu that also satisfy the desired thermal and chemical stability and low optical loss at operating wavelengths have only recently been prepared. See Dalton et al., "New Class of High Hyperpolarizability Organic Chromophores and Process for Synthesizing the Same," WO 00/09613. However, materials characterized as having such large $\mu\beta$ values suffer from large intermolecular electrostatic interactions that lead to intermolecular aggregation resulting in light scattering and unacceptably high values of optical loss. A chromophore's optical nonlinearity ($\mu\beta$) can be measured as described in Dalton et al., "Importance of Intermolecular Interactions in the Nonlinear Optical Properties of Poled Polymers," *Applied Physics Letters*, Vol. 76, No. 11, pp. 1368-1370 (2000). A chromophore's electro-optic coefficient ($r_{33}$) can be measured in a polymer matrix using attenuated total reflection (ATR) technique at telecommunication wavelengths of 1.3 or 1.55 µm. A representative method for measuring the electro-optic coefficient is described in Dalton et al., "Importance of Intermolecular Interactions in the Nonlinear Optical Properties of Poled Polymers," *Applied Physics Letters*, Vol. 76, No. 11, pp. 1368-1370 (2000).

Many molecules can be prepared having high hyperpolarizability values, however their utility in electro-optic devices is often diminished by the inability to incorporate these molecules into a host material with sufficient noncentrosymmetric molecular alignment to provide a device with acceptable electro-optic activity. Molecules with high hyperpolarizability typically exhibit strong dipole-dipole interactions in solution or other host material that makes it difficult to achieve a high degree of noncentrosymmetric order without minimizing undesirable spatially anisotropic intermolecular electrostatic interactions.

Chromophore performance is dependent on chromophore shape. See Dalton et al., "Low (Sub-1-Volt) Halfwave Voltage Polymeric Electro-optic Modulators Achieved by Controlling Chromophore Shape," *Science*, Vol. 288, pp. 119-122 (2000).

Chemical, thermal, and photochemical stabilities are imparted to the chromophores through their chemical structure and substituent choice. For example, in certain embodiments, the chromophore's active hydrogens are substituted with groups (e.g., alkyl, fluorine) to impart increased stability to the chromophore.

Thus, the effectiveness of organic nonlinear optical materials having high hyperpolarizability and large dipole moments can be limited by the tendency of these materials to aggregate when processed into electro-optic devices. The result is a loss of optical nonlinearity. Accordingly, improved nonlinear optically active materials having large hyperpolarizabilities and large dipole moments and that, when employed in electro-optic devices, exhibit large electro-optic coefficients may be advantageous for many applications.

For the fabrication of practical electro-optical (E-O) devices, critical material requirements, such as large E-O coefficients, high stability (thermal, chemical, photochemical, and mechanical), and low optical loss, need to be simultaneously optimized. In the past decade, a large number of highly active nonlinear optical (NLO) chromophores have been synthesized, and some of these exhibit very large macroscopic optical nonlinearities in high electric field poled guest/host polymers. To maintain a stable dipole alignment, it is a common practice to utilize either high glass transition temperature ($T_g$) polymers with NLO chromophores as side chains or crosslinkable polymers with NLO chromophores that could be locked in the polymer network. However, it is difficult to achieve both large macroscopic nonlinearities and good dipole alignment stability in the same system. This is due to strong intermolecular electrostatic interactions among high dipole moment chromophores and high-temperature aromatic-containing polymers, such as polyimides and polyquinolines that tend to form aggregates. The large void-containing dendritic structures may provide an attractive solution to this critical issue because the dendrons can effectively decrease the interactions among chromophores due to the steric effect. Furthermore, these materials are monodisperse, well-defined, and easily purifiable compared to polymers that are made by the conventional synthetic approaches.

SUMMARY OF THE INVENTION

The present invention provides an electro-optic dendrimer-based glass composite useful in photonics, methods for making the composite, and electro-optic devices that include the composite.

In one aspect, the present invention provides composites.

In one embodiment, the composite comprises:

(a) a chromophore compound having a π-electron donor group electronically conjugated to a π-electron acceptor group through π-electron bridge group, the compound having the formula:

$$D_1\text{-}\pi_1\text{-}B_1\text{-}\pi_2\text{-}A_1$$

wherein $D_1$ is a π-electron donor group, $B_1$ is a π-electron bridge group, $A_1$ is a π-electron acceptor group, $\pi_1$ is a π bridge electronically conjugating $D_1$ to $B_1$, $\pi_2$ is a π bridge electronically conjugating $B_1$ to $A_1$, wherein $\pi_1$ and $\pi_2$ may each be present or absent; and (b) a dendronized chromophore compound having a π-electron donor group electronically conjugated to a π-electron acceptor group through π-electron bridge group, the compound having the formula:

$$D_2\text{-}\pi_3\text{-}B_2\text{-}\pi_4\text{-}A_2$$

wherein $D_2$ is a π-electron donor group, $B_2$ is a π-electron bridge group, $A_2$ is a π-electron acceptor group, $\pi_3$ is a π bridge electronically conjugating $D_2$ to $B_2$, $\pi_3$ is a π bridge electronically conjugating $B_2$ to $A_2$, wherein $\pi_3$ and $\pi_4$ may each be present or absent, wherein one or more of the donor, bridge, or acceptor groups is substituted with a dendron;

and wherein $D_1$ and $D_2$ are the same or different, $B_1$ and $B_2$ are the same or different, $A_1$ and $A_2$ are the same or different, and $\pi_1$, $\pi_2$, $\pi_3$, and $\pi_4$ are the same or different.

In another embodiment, the composite comprises:

(a) a chromophore compound having a π-electron donor group electronically conjugated to a π-electron acceptor group through π-electron bridge group, the compound having the formula:

$$D_1\text{-}\pi_1\text{-}B_1\text{-}\pi_2\text{-}A_1$$

wherein $D_1$ is a π-electron donor group, $B_1$ is a π-electron bridge group, $A_1$ is a π-electron acceptor group, $\pi_1$ is a π bridge electronically conjugating $D_1$ to $B_1$, $\pi_2$ is a π bridge electronically conjugating $B_1$ to $A_1$, wherein $\pi_1$ and $\pi_2$ may each be present or absent; and (b) a dendronized chromophore compound having a π-electron donor group electronically conjugated to a π-electron acceptor group through π-electron bridge group, the compound having the formula:

$$D_2\text{-}\pi_3\text{-}B_2\text{-}\pi_4\text{-}A_2$$

wherein $D_2$ is a π-electron donor group, $B_2$ is a π-electron bridge group, $A_2$ is a π-electron acceptor group, $\pi_3$ is a π bridge electronically conjugating $D_2$ to $B_2$, $\pi_3$ is a π bridge electronically conjugating $B_2$ to $A_2$, wherein $\pi_3$ and $\pi_4$ may each be present or absent, wherein one or more of the donor, bridge, or acceptor groups is substituted with a dendron;

wherein $D_1$ and $D_2$ are the same or different, $B_1$ and $B_2$ are the same or different, $A_1$ and $A_2$ are the same or different, and $\pi_1$, $\pi_2$, $\pi_3$, and $\pi_4$ are the same or different;

and wherein the dendronized chromophore compound is covalently coupled to the chromophore compound through a linkage. In one embodiment, the dendronized chromophore compound is covalently coupled to the chromophore compound by a 4+2 cycloaddition product.

In another aspect of the invention, methods for making the composite are provided.

In one embodiment, the invention provides a method for forming an at least partially aligned chromophore composite, comprising:

(a) depositing a composite onto a substrate, wherein the composite comprises:

(i) a chromophore compound having a π-electron donor group electronically conjugated to a π-electron acceptor group through π-electron bridge group, the compound having the formula:

$$D_1\text{-}\pi_1\text{-}B_1\text{-}\pi_2\text{-}A_1$$

wherein $D_1$ is a π-electron donor group, $B_1$ is a π-electron bridge group, $A_1$ is a π-electron acceptor group, $\pi_1$ is a π bridge electronically conjugating $D_1$ to $B_1$, $\pi_2$ is a π bridge electronically conjugating $B_1$ to $A_1$, wherein $\pi_1$ and $\pi_2$ may each be present or absent; and (ii) a dendronized chromophore compound having a π-electron donor group electronically conjugated to a π-electron acceptor group through π-electron bridge group, the compound having the formula:

$$D_2\text{-}\pi_3\text{-}B_2\text{-}\pi_4\text{-}A_2$$

wherein $D_2$ is a π-electron donor group, $B_2$ is a π-electron bridge group, $A_2$ is a π-electron acceptor group, $\pi_3$ is a π bridge electronically conjugating $D_2$ to $B_2$, $\pi_3$ is a $\pi$ bridge electronically conjugating $B_2$ to $A_2$, wherein $\pi_3$ and $\pi_4$ may each be present or absent, wherein one or more of the donor, bridge, or acceptor groups is substituted with a dendron;

and wherein $D_1$ and $D_2$ are the same or different, $B_1$ and $B_2$ are the same or different, $A_1$ and $A_2$ are the same or different, and $\pi_1$, $\pi_2$, $\pi_3$, and $\pi_4$ are the same or different;

(b) subjecting the composite to a temperature equal to or greater than the glass transition temperature of the composite;

(c) applying an aligning force to the composite; and (d) reducing the temperature of the composite below the glass transition temperature of the composite to provide a hardened, at least partially aligned chromophore composite.

In another embodiment, the invention provides a method for forming an at least partially aligned chromophore composite, comprising:

(a) depositing a composite onto a substrate, wherein the composite comprises:

(i) a chromophore compound having a $\pi$-electron donor group electronically conjugated to a $\pi$-electron acceptor group through $\pi$-electron bridge group, the compound having the formula:

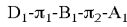
$D_1$-$\pi_1$-$B_1$-$\pi_2$-$A_1$ wherein $D_1$ is a $\pi$-electron donor group, $B_1$ is a $\pi$-electron bridge group, $A_1$ is a $\pi$-electron acceptor group, $\pi_1$ is a $\pi$ bridge electronically conjugating $D_1$ to $B_1$, $\pi_2$ is a $\pi$ bridge electronically conjugating $B_1$ to $A_1$, wherein $\pi_1$ and $\pi_2$ may each be present or absent; and (ii) a dendronized chromophore compound having a $\pi$-electron donor group electronically conjugated to a $\pi$-electron acceptor group through $\pi$-electron bridge group, the compound having the formula:

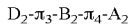
$D_2$-$\pi_3$-$B_2$-$\pi_4$-$A_2$ wherein $D_2$ is a $\pi$-electron donor group, $B_2$ is a $\pi$-electron bridge group, $A_2$ is a $\pi$-electron acceptor group, $\pi_3$ is a $\pi$ bridge electronically conjugating $D_2$ to $B_2$, $\pi_3$ is a $\pi$ bridge electronically conjugating $B_2$ to $A_2$, wherein $\pi_3$ and $\pi_4$ may each be present or absent, wherein one or more of the donor, bridge, or acceptor groups is substituted with a dendron;

and wherein $D_1$ and $D_2$ are the same or different, $B_1$ and $B_2$ are the same or different, $A_1$ and $A_2$ are the same or different, and $\pi_1$, $\pi_2$, $\pi_3$, and $\pi_4$ are the same or different;

and wherein the chromophore compound and the dendronized chromophore compound each include a functional group reactive toward one another such that the chromophore compound and the dendronized chromophore compound can be covalently coupled;

(b) subjecting the composite to a temperature equal to or greater than the glass transition temperature of the composite;

(c) applying an aligning force to the composite to provide an at least partially aligned chromophore composite;

(d) subjecting the at least partially aligned chromophore composite to the conditions needed to covalently couple the chromophore compound and the dendronized chromophore compound, to provide an at least partially aligned, linked chromophore composite; and (e) reducing the temperature of the composite below the glass transition temperature of the at least partially aligned, linked chromophore composite to provide a hardened, at least partially aligned, linked chromophore composite.

In further aspects, the present invention provides electro-optic devices that include the composites.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

Figure 1:
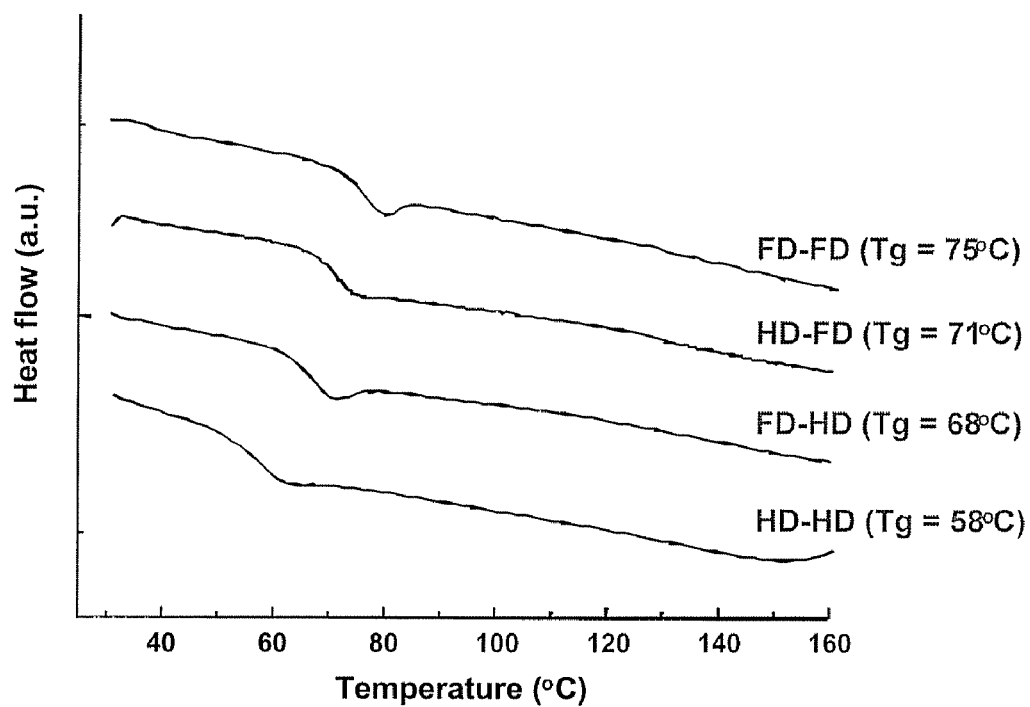
FIG. 1 illustrates differential scanning calorimetry curves for four representative dendronized chromophore compounds useful in the composite of the invention.

In one aspect, the present invention provides a composite that includes a nonlinear optically active chromophore compound dispersed in a host material comprising a dendronized chromophore compound. The composite demonstrates ultra-high electro-optic (E-O) activity (1200 pm/V) and enables the fabrication of E-O devices (e.g., modulators) having very low modulating voltages (<0.1 V). Poled composites of the invention have $r_{33}$ as high as about 310 pm/V at 1320 nm.

The nonlinear optically active chromophore compounds ("chromophore compounds") useful in the composite of the invention include a $\pi$-electron donor group (D) electronically conjugated to a $\pi$-electron acceptor group (A) through $\pi$-electron bridge group (B). The chromophore compounds have the general formula:

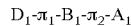
$D_1$-$\pi_1$-$B_1$-$\pi_2$-$A_1$ wherein $D_1$ is a $\pi$-electron donor group, $B_1$ is a $\pi$-electron bridge group, $A_1$ is a $\pi$-electron acceptor group, $\pi_1$ is a $\pi$ bridge electronically conjugating $D_1$ to $B_1$, $\pi_2$ is a $\pi$ bridge electronically conjugating $B_1$ to $A_1$, wherein $\pi_1$ and $\pi_2$ may each be present or absent.

The composite of the invention can include virtually any nonlinear optically active chromophore compound that can be acentrically aligned by poling in an electric field. The composite's dendronized chromophore compound environment will enhance the electro-optic activity of the included chromophore compound. Representative chromophore compounds useful in the composite of the invention include those described in U.S. patent application Ser. Nos. 09/912,444, 10/212,473, 10/347,117, 10/758,292, 11/044,986, and 11/064,420, each expressly incorporated herein by reference in its entirety.

The chromophore compounds useful in the composite of the invention generally have high electro-optic coefficients; large hyperpolarizability; large dipole moments; chemical, thermal, electrochemical, and photochemical stability; low absorption at operating wavelengths (e.g., 1.3 and 1.55 μm); and suitable solubility in solvents used for making the composites.

Nonlinear optical activity of chromophore compounds depends mainly on the compound's hyperpolarizability ($\beta$). A measure of a compound's nonlinearity is $\mu\beta$, where $\mu$ is the compound's dipole moment. A compound's optical nonlinearity ($\mu\beta$) can be measured as described in Dalton et al., "Importance of Intermolecular Interactions in the Nonlinear Optical Properties of Poled Polymers", *Applied Physics Letters*, Vol. 76, No. 11, pp. 1368-1370 (2000).

A compound or composite's electro-optic coefficient ($r_{33}$) can be measured using attenuated total reflection (ATR) technique at telecommunication wavelengths of 1.3 or 1.55 μm. A representative method for measuring the electro-optic coefficient is described in Dalton et al., "Importance of Intermolecular Interactions in the Nonlinear Optical Properties of Poled Polymers", *Applied Physics Letters*, Vol. 76, No. 11, pp. 1368-1370 (2000).

Figure 3:
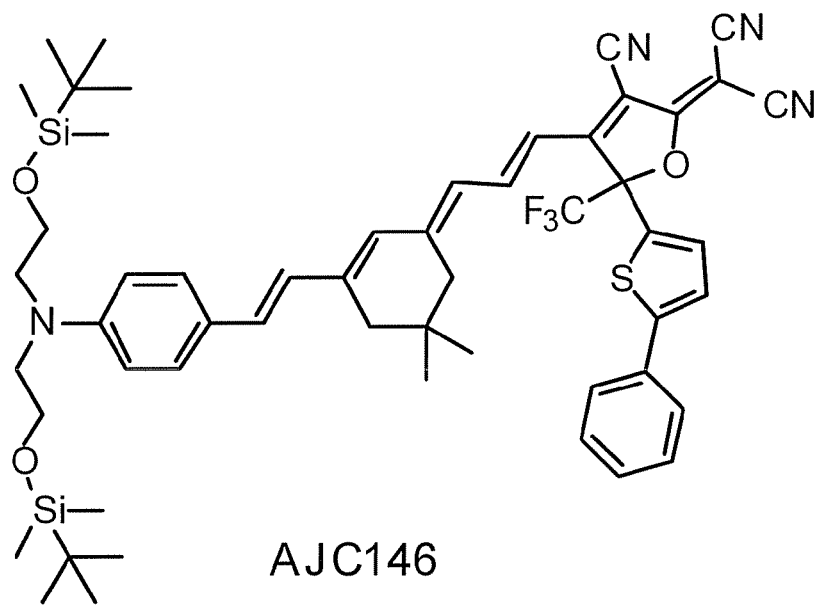
FIG. 3 illustrates two representative nonlinear optically active chromophore compounds useful in the composite of the invention.
Figure 3:
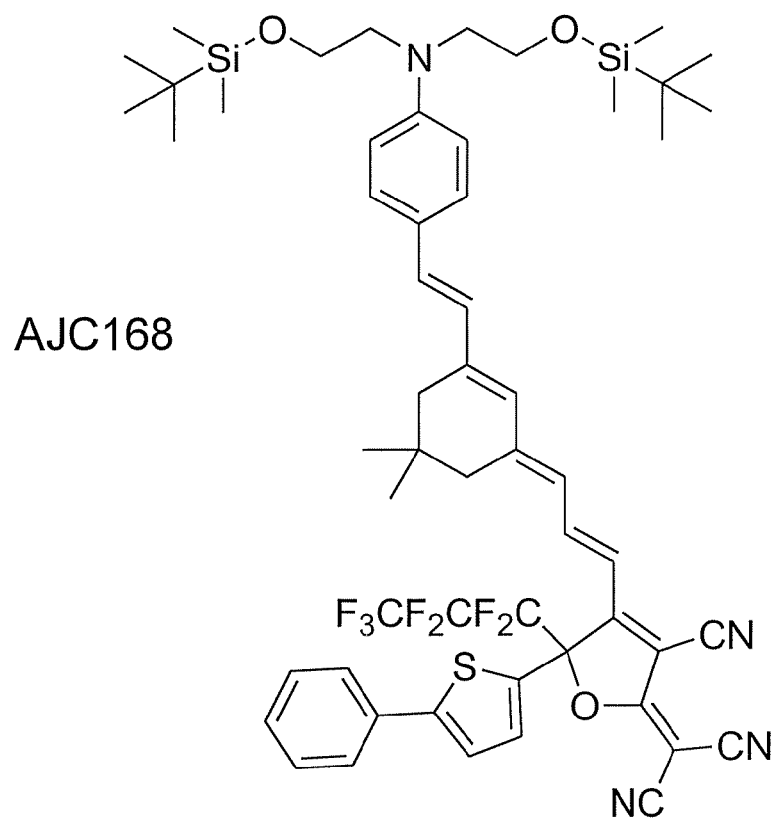
Figure 4:
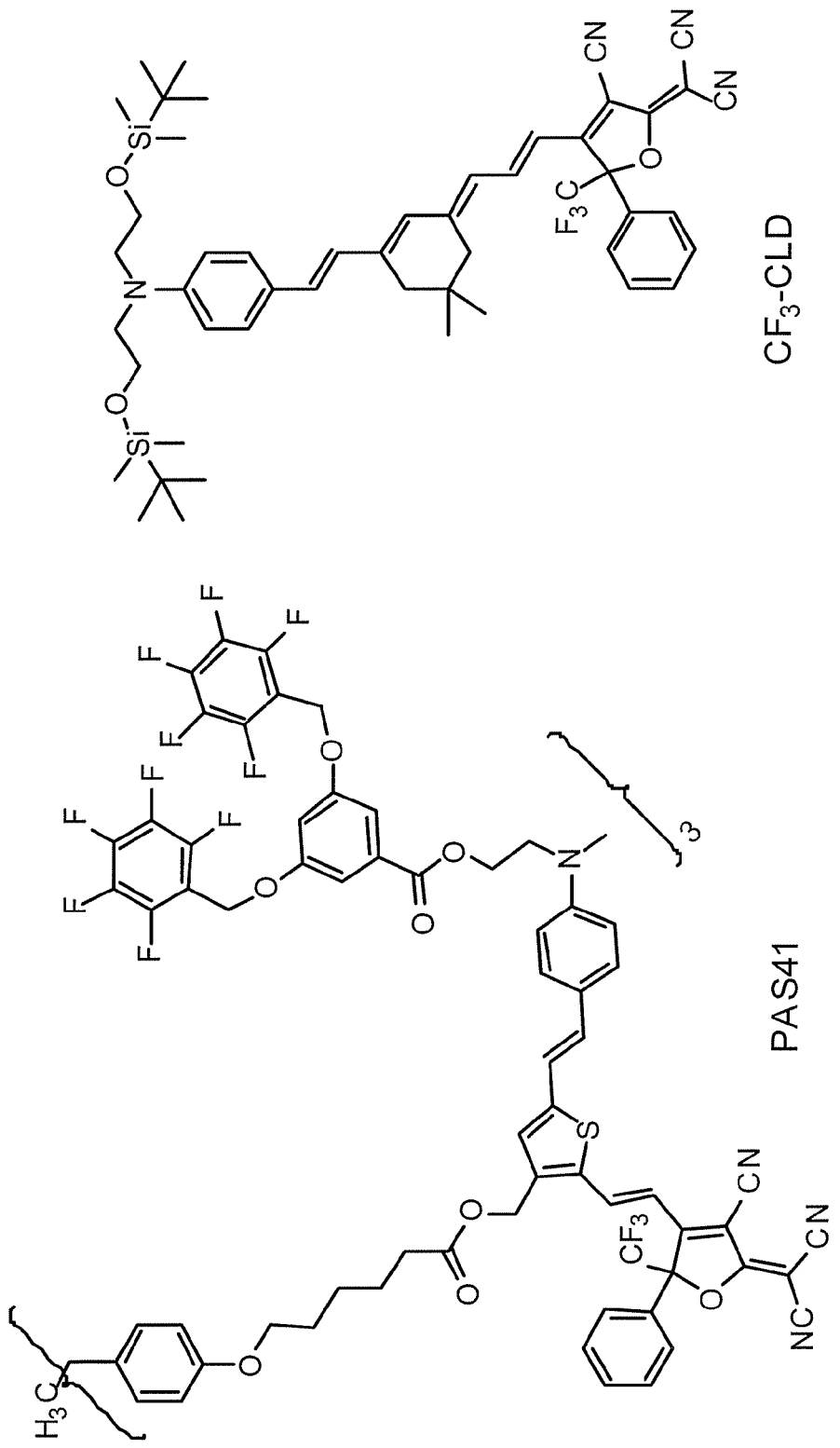
FIG. 4 illustrates two representative dendronized chromophore compounds useful in the composite of the invention.

A representative chromophore compound (designated AJC146) useful in the composite of the invention is illustrated in FIG. 3. The preparation of this representative chromophore compound is described in Example 3 and illustrated schematically in FIG. 5. A second representative chromophore compound (designated AJC-168) useful in the composite of the invention is also illustrated FIG. 3. A third representative chromophore compound (designated $CF_3$-CLD) useful in the composite of the invention is illustrated in FIG. 4.

The dendronized chromophore compounds useful in the composite of the invention include a π-electron donor group (D) electronically conjugated to a π-electron acceptor group (A) through π-electron bridge group (B) in which one or more of the donor, bridge, or acceptor groups is substituted with a dendron. In one embodiment, the compound's donor and bridge groups are substituted with a dendron. In one embodiment, the compound's donor group is substituted with a dendron. In one embodiment, the compound's bridge group is substituted with a dendron.

In one embodiment, the dendronized chromophore compounds of the invention have the general formula:

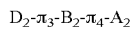

$$D_2\text{-}\pi_3\text{-}B_2\text{-}\pi_4\text{-}A_2$$

wherein $D_2$ is a π-electron donor group, $B_2$ is a π-electron bridge group, $A_2$ is a π-electron acceptor group, $\pi_3$ is a π bridge electronically conjugating $D_2$ to $B_2$, $\pi_3$ is a π bridge electronically conjugating $B_2$ to $A_2$, wherein $\pi_3$ and $\pi_4$ may each be present or absent, wherein one or more of the donor, bridge, or acceptor groups is substituted with a dendron;

With regard to the chromophore compound, $D_1$ and $D_2$ may be the same or different, $B_1$ and $B_2$ may be the same or different, $A_1$ and $A_2$ may be the same or different, and $\pi_1$, $\pi_2$, $\pi_3$, and $\pi_4$ may be the same or different.

The following definitions relate to the nonlinear optically active chromophore compounds and the dendronized chromophore compounds defined above.

As used herein, "donor" (represented by D) is an atom or group of atoms with low electron affinity relative to an acceptor (represented by A, defined below) such that, when the donor is conjugated to an acceptor through a π-electron bridge, electron density is transferred from the donor to the acceptor.

An "acceptor" (represented by A) is an atom or group of atoms with high electron affinity relative to a donor such that, when the acceptor is conjugated to a donor through a π-electron bridge, electron density is transferred from the acceptor to the donor.

A "bridge" (represented by B) is an atom or group of atoms that electronically conjugates the donor to the acceptor such that, when the acceptor is conjugated to the donor, electron density is transferred from the acceptor to the donor.

Representative donor, acceptor, and bridge groups known to those skilled in the art are described in U.S. Pat. Nos. 6,067,186; 6,090,332; 5,708,178; and 5,290,630.

A "dendron" is a branched substituent that has regularly repeating subunits. A dendrimer is a macromolecular structure that contains a core surrounded by one or more dendrons.

Figure 2:
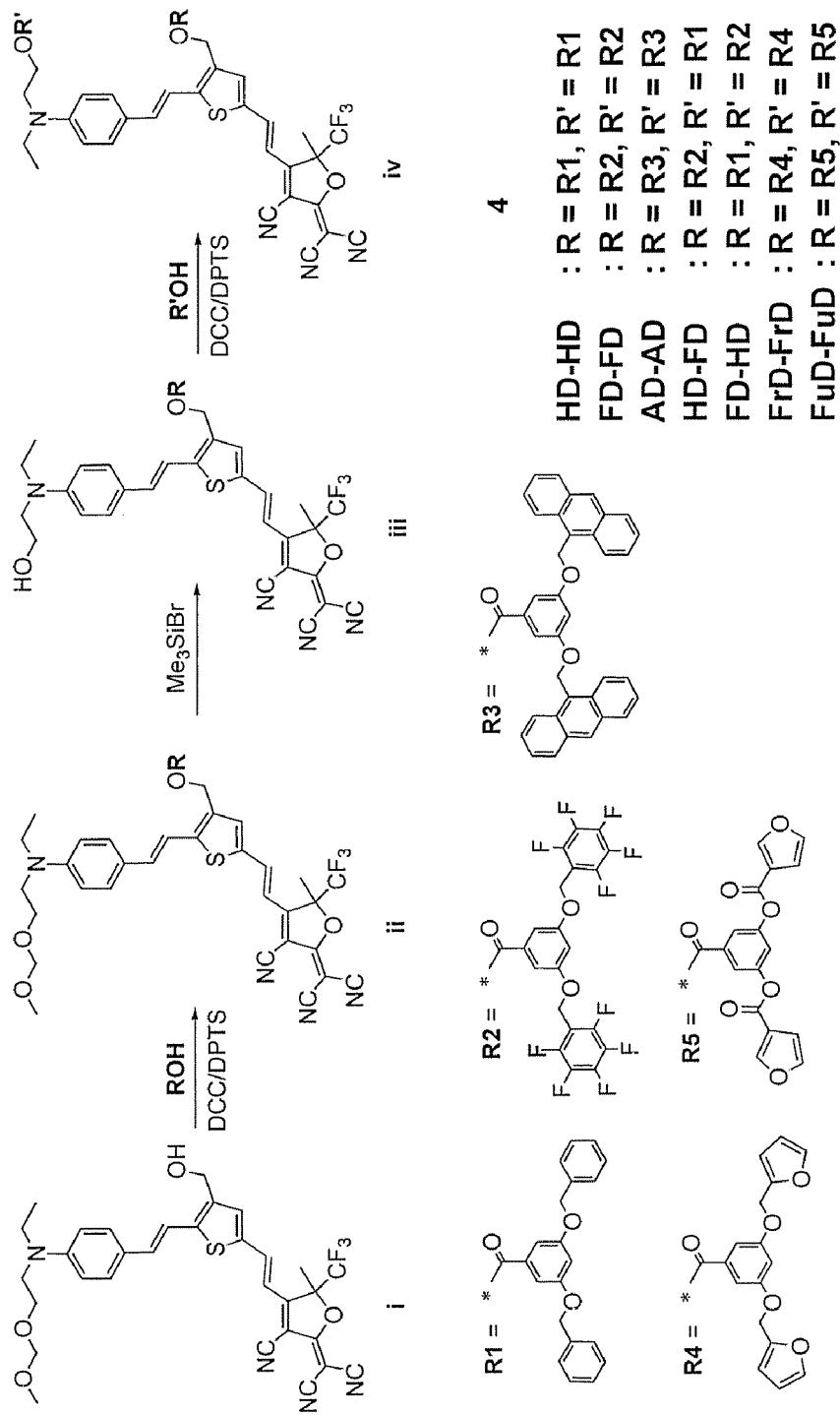
FIG. 2 illustrates the synthesis of representative dendronized chromophore compounds useful in the composite of the invention.

Representative dendron groups are illustrated in FIG. 2 (see, for example $R_1$-$R_5$.

Figure 18:
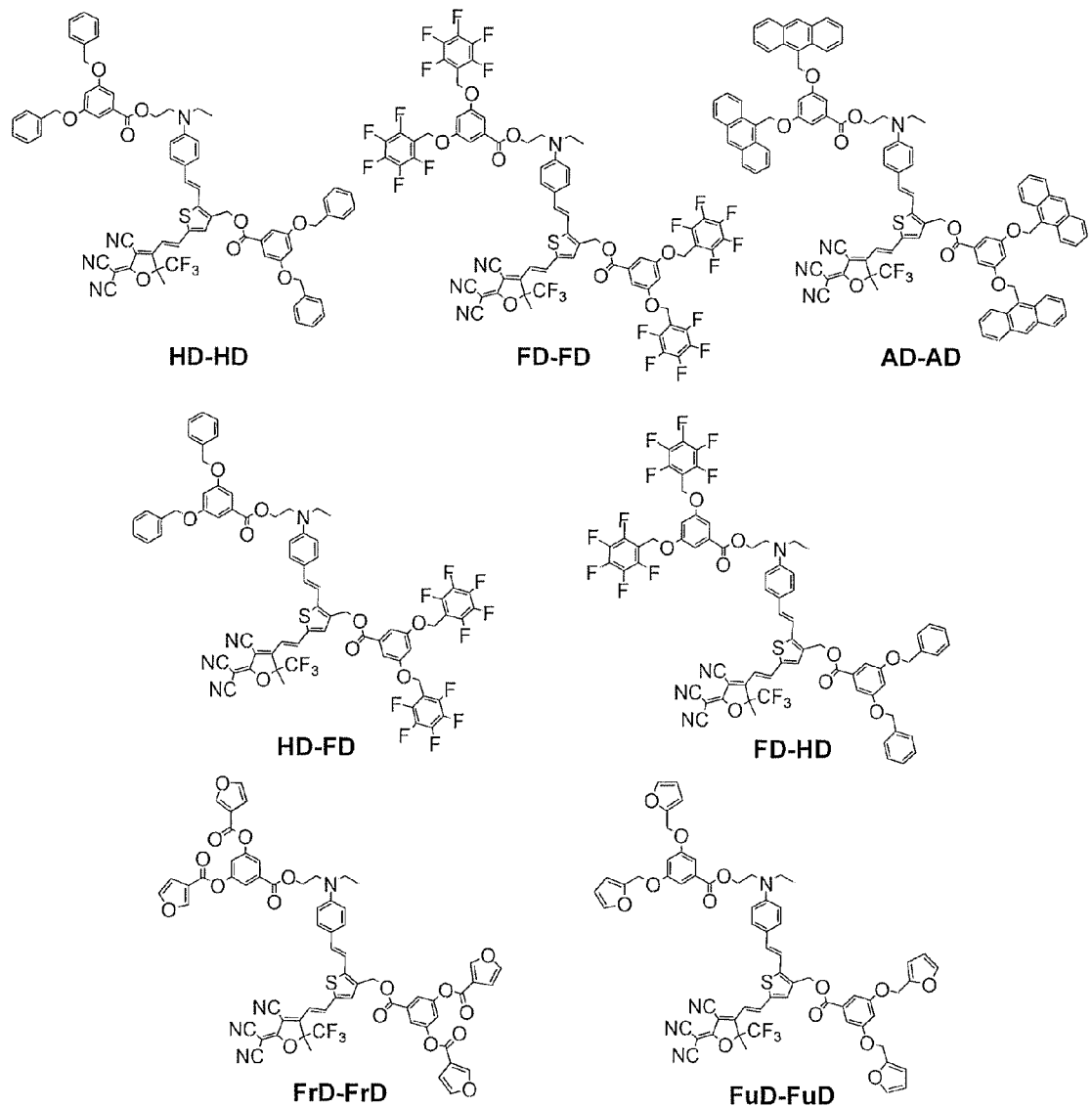

Representative dendronized chromophores useful in the composite of the invention include those illustrated in FIG. 2. The preparations of representative dendronized chromophores designated HD-HD, HD-FD, FD-HD, FD-FD, FrD-FrD, AD-AD, and FuD-FuD from suitably functionalized representative chromophore compounds are illustrated schematically in FIG. 2 and described in Example 2. The resulting structures are illustrated in FIG. 18. It will be appreciated that the suitably functionalized chromophore compound from which the dendronized chromophores are prepared may be varied and can include any suitably functionalized chromophore compound having the general structure D-$\pi_1$-B-$\pi_2$-A, as defined above for nonlinear optically active chromophore compounds. Similarly, although specific dendrons are illustrated in FIG. 2, it will be appreciated that dendrons other than those illustrated can be used to prepare the dendronized chromophore compounds useful in the composite of the invention.

The representative dendronized chromophore compounds illustrated in FIG. 2 each show a strong charge-transfer absorption band around 670 nm in 1,4-dioxane solution. These compounds also have typical glass-transition temperature in the range between 58 and 75° C. as shown in FIG. 1. Of these dendronized chromophore compounds, HD-FD exhibits both high dielectric strength and excellent thermal and electrical properties during poling. For that reason, HD-FD was selected as the model host material into which was incorporated highly efficient chromophore AJC146 for the systematic poling studies presented below.

Composites can be created by spin coating onto a substrate from solution. Many representative dendronized chromophores are soluble in chloroform, cyclopentanone, 1,1,2-trichloroethane, and THF. Pinhole free thin films can be prepared by spin coating directly from 1,1,2-trichloroethane solution. The film surfaces are typically highly uniform as measured by atomic force microscopy (typically about 0.5 nm of root-mean-squared roughness). The formation of molecular glasses and their thermal transition properties were studied by differential scanning calorimetry (DSC). The thermal analyses of the chromophores showed a typical slope change of an amorphous glass transition. The measured properties are summarized in Table 1. Typical DSC cycles show amorphous behavior, without melting peaks. Typical X-ray diffractions patterns also show no peaks for representative spin coated films.

TABLE 1

Physical and optical properties of representative dendronized chromophore compounds and composites of the invention.

| Materials | $T_g$ (°C.) | Density of Chromophore (wt %) | $\lambda_{max}$ solution (nm) | $\lambda_{max}$ thin film (nm) | Poling Temp (°C.) | Applied Voltage (MV/cm) | $r_{33}$ (pm/V) @ 1.3 μm |
|---|---|---|---|---|---|---|---|
| HD-HD | 58 | 44 | 667 | 720 | 58 | 0.75 | 52 |
| HD-FD | 72 | 39 | 671 | 705 | 75 | 1.0 | 108 |
| FD-HD | 68 | 39 | 661 | 697 | — | — | — |
| FD-FD | 75 | 34 | 655 | 690 | 75 | 0.75 | 51 |
| AD-AD | 153 | 32 | 670 | 771 | — | — | — |
| FRD-FRD | 62 | 43 | — | 706 | 115 | 0.75 | 63 |
| FUD-FUD | 102 | 45 | — | 714 | 130 | 1.1 | 99 |
| HD-HD/FD-FD (EQUIMOLAR) | 68 | 39 | 670 | 704 | 70 | 1.2 | 130 |
| HD-FD/AJC146 (75/25) | — | — | — | 727 | 65 | 0.9 | 275 |
| HD-FD/AJC146 (50/50) | — | — | — | 794 | 65 | 0.8 | 327 |
| D3-AJT/AJC168 | 106 | — | — | 730 | 90 | 0.8 | 193 |
| D4-AJT/AJC168 | 115 | — | — | 730 | 110 | 0.6 | 198 |

$T_g$: glass transition temperature measured by DSC under nitrogen at the heating rate of 10° C./min;

Density of chromophores: the donor-bridge-acceptor core part of chromophoric moiety (formula $C_{28}H_{21}F_3N_4OS$, molecular weight 518.6), is counted for chromophore loading density;

$\lambda_{max}$: maximum absorption wavelength of thin solid films by UV-vis spectroscopy; $r_{33}$: and E-O coefficient measured by simple reflection at the wavelength of 1300 nm.

As shown in Table 1, HD-FD/AJC146, as a representative composite of the invention, was formulated by varying different amounts of chromophore compound (i.e., AJC146) in the dendronized chromophore compound (i.e., HD-FD) host material. The preliminary poling results showed that exceptionally large E-O coefficients (up to from about 270 to about 310 pm/V) can be obtained. Most amazingly, the E-O activity of these poled samples can retain about 90% of their original value after storage at room temperature for more than 500 hours. This phenomenon is in sharp contrast to the commonly observed quick relaxation of poling induced polar order in low $T_g$ nonlinear optically active (NLO) polymers.

In addition to the dendronized chromophore compounds described above which include a single chromophoric group (i.e., a single D-π-B-π-A group), other dendronized chromophore compounds can be used as host materials in the composites of the invention. Other suitable dendronized chromophore compounds include multi-chromophoric dendrimers that include two or more chromophoric groups. In one embodiment, the dendronized chromophore compound includes two chromophoric groups (i.e., two D-π-B-π-A groups). In one embodiment, the dendronized chromophore compound includes three chromophoric groups (i.e., three D-π-B-π-A groups).

Figure 15:
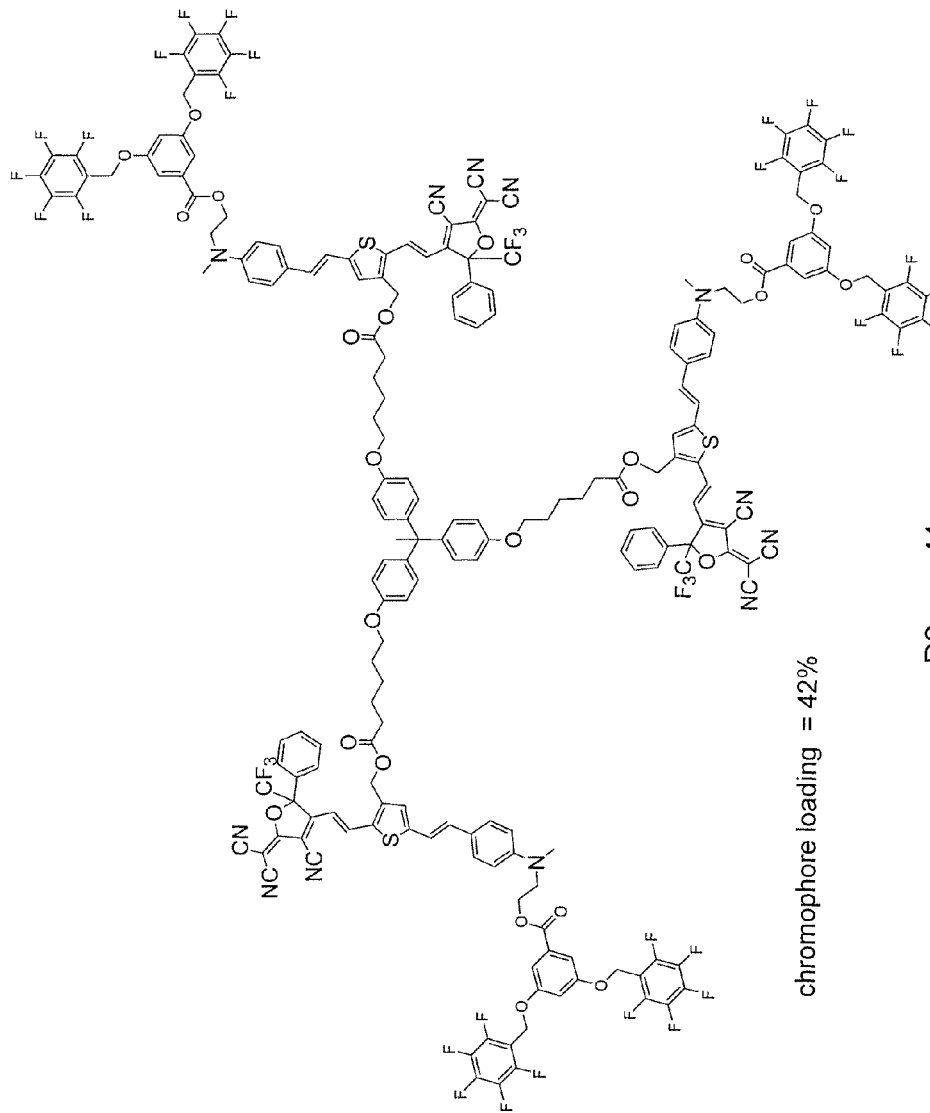

A representative dendronized chromophore compound that includes three chromophoric groups is a multi-arm fluorinated dendrimer shown in FIG. 15 (designated D2.pas.41). The preparation of this dendrimer is described in Example 4 and illustrated in FIGS. 6-14. It will be appreciated that dendronized chromophore compounds useful in the composite of the invention can include virtually any chromophoric group (i.e., D-π-B-π-A group) and any dendron.

Multi-arm fluorinated dendrimer PAS41 exhibited high E-O coefficients around 120 pm/V and glass transition temperature of 90° C. Doping this dendrimer with chromophore $CF_3$-CLD provided a composite having ultra-high EO coefficients around 240~270 pm/V.

Figure 16:
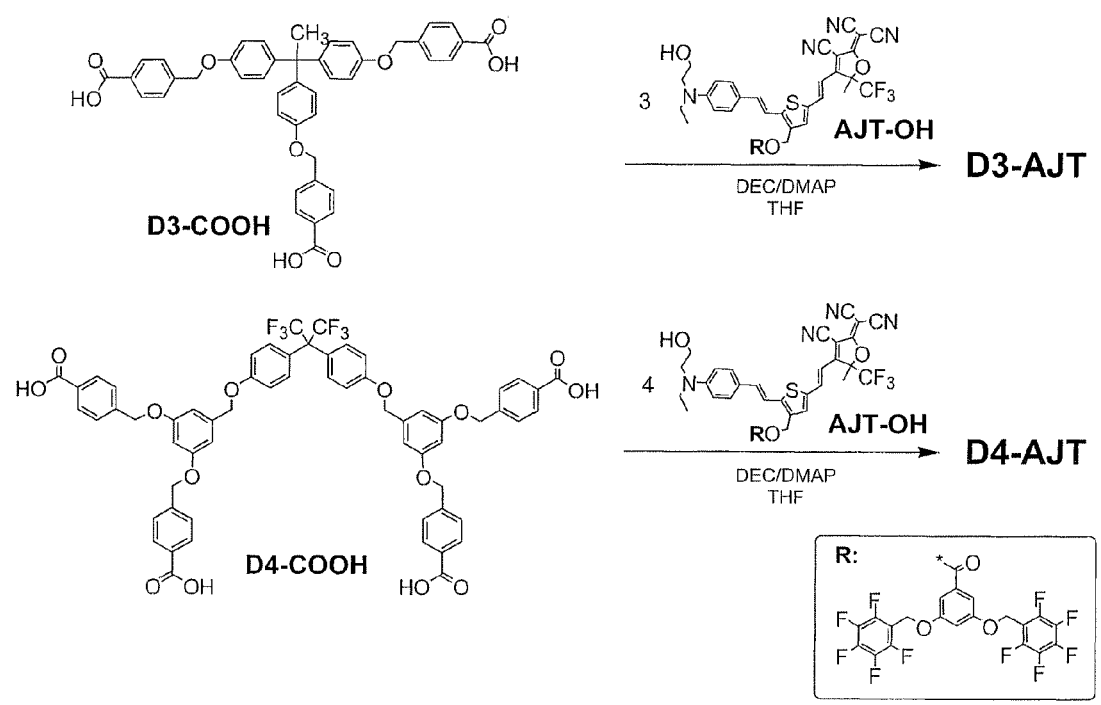
Figure 17A:
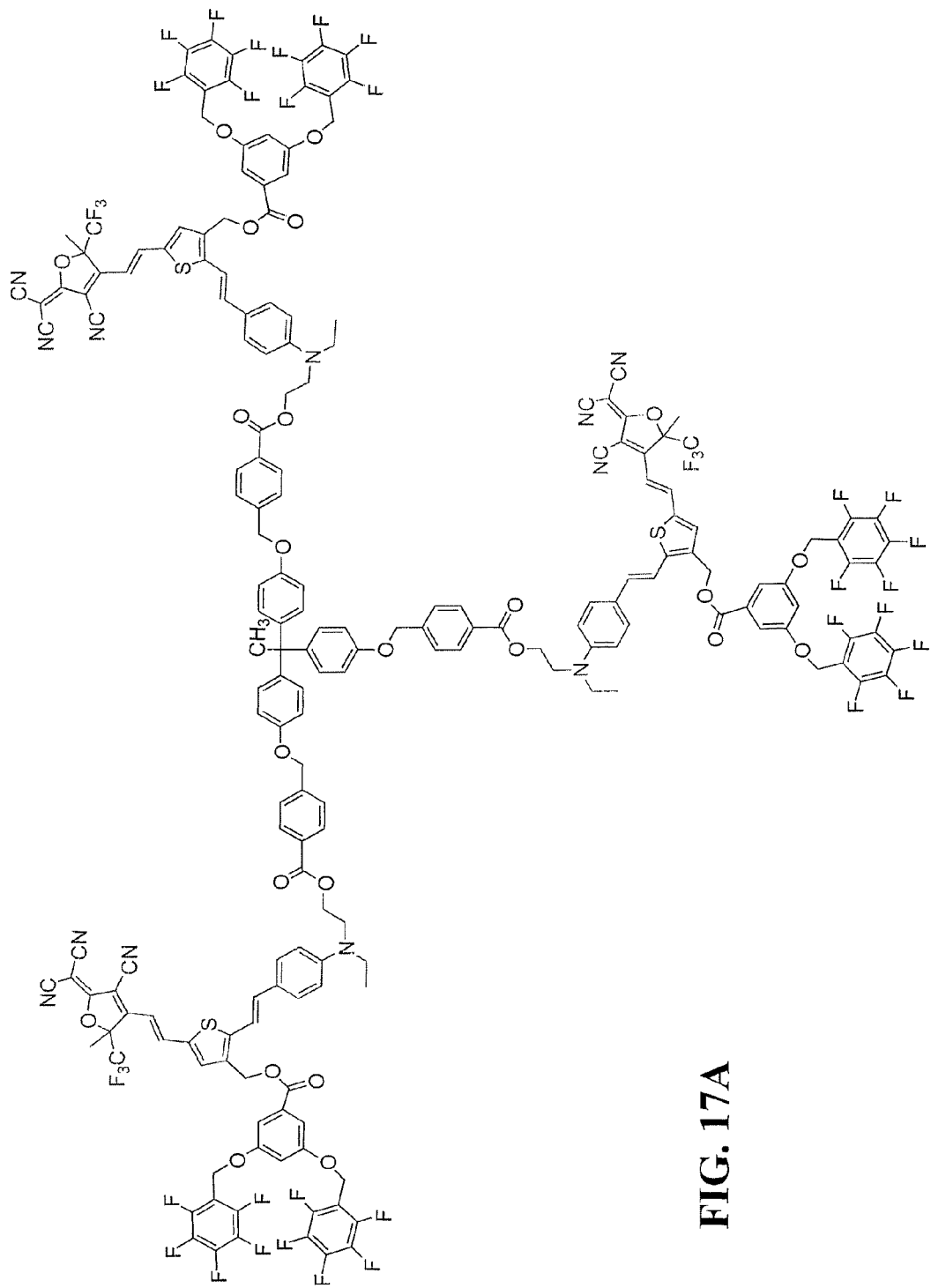
FIGS. 17-20 illustrate representative dendronized chromophore compounds useful in the composite of the invention.
Figure 17B:
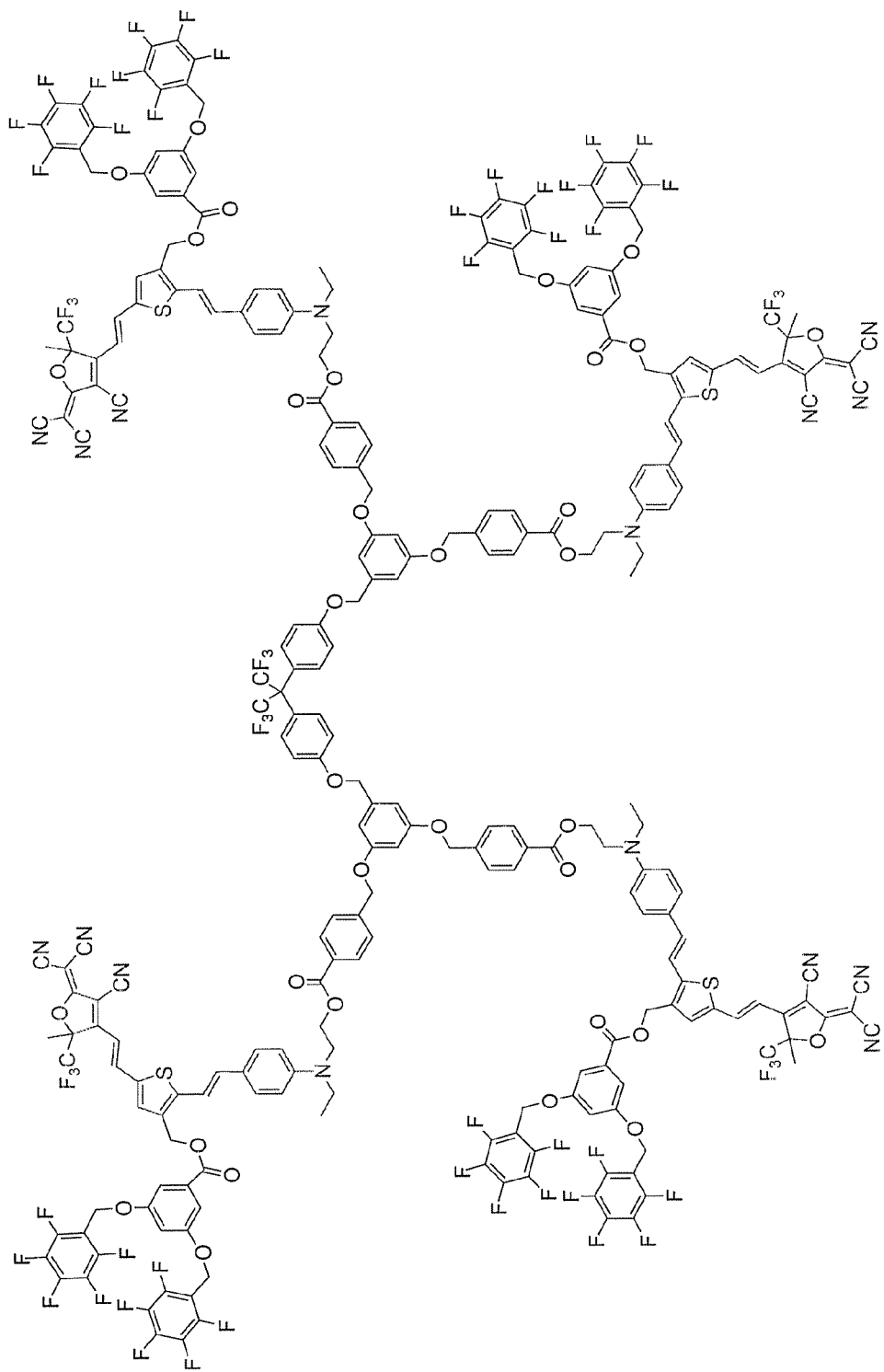

Additional representative multi-armed dendrimers D3-AJT and D4-AJT are illustrated in FIGS. 17A and 17B, respectively, and their synthesis is described in Example 5 and illustrated in FIG. 16. Similar to PAS41, D3-AJT has three dendrimer arms, each containing a chromophore. D4-AJT has four arms, each containing a chromophore, for a total of four chromophore units in a single molecule. The use of multi-arm, multi-chromophore dendrimer molecules can lead to large electro-optic activity and high thermal stability in a single molecule. For example, D4-AJT has a glass transition temperature of 123° C. and an EO coefficient of 83 pm/V. When a multi-chromophore dendrimer compound is incorporated into a composite with a chromophore compound, large electro-optic activity can be achieved. A composite of D3-AJT and AJC168 has an $r_{33}$=193 and a composite of D4-AJT and AJC168 has an $r_{33}$=198.

The stability of the composite film can be further enhanced by covalently coupling (i.e., linking) the dendrimer chromophore compounds to the chromophore compounds. This can be done either through a direct linkage, or with the assistance of other compounds. Additionally, the linkage may include intermediate compounds that are not dendrimer chromophore compounds or chromophore compounds.

Of particular interest in linking the compound molecules is the use of the Diels-Alder 4+2 cycloaddition reaction. The Diels-Alder (DA) reaction involves covalent coupling of a "diene" with a "dienophile" to provide a cyclohexene cycloadduct. See, for example, Kwart, H., and K. King, *Chem. Rev.* 68:415, 1968. Most DA cycloaddition reactions can be described by a symmetry-allowed concerted mechanism without generating the biradical or zwitterion intermediates. Among many features of the DA reaction is that the resultant adducts can be reversibly thermally cleaved to regenerate the starting materials (i.e., diene and dienophile). For example, the retro-DA reaction has been exploited to thermally crosslink linear polymers that are capable of reverting to their thermoplastic precursors by heating. See, for example, (a) Chen, X., et al., *Science* 295:1698, 2002; (b) Gousse, C., et al., *Macromolecules* 31:314, 1998; (c) McElhanon, J. R., and D. R. Wheeler, *Org. Lett.* 3:2681, 2001. The linked compounds of the invention are prepared by a method that utilizes process advantages in hardening E-O composites to achieve a composite having both high nonlinearity and thermal stability.

As used herein, the term "diene" refers to a 1,3-diene that is reactive toward a dienophile to provide a 4+2 (Diels-Alder) cycloaddition product (i.e., a cyclohexene). The term "dienophile" refers to an alkene that is reactive toward a diene to provide a 4+2 cycloaddition product. The term "dienophile precursor" refers to a moiety that can be converted to a dienophile. Suitable dienes and dienophiles may be unsubstituted or substituted.

The DA process is only one of many methods of linking compounds for the present invention. There are many methods of linkage known to those skilled in the art including the irreversible fluorovinyl ether coupling reaction.

A representative example of linking chromophore molecules in a composite uses the Diels-Alder (DA) reaction. The choice of dendrimer chromophore compound and chromophore compound used is determined largely by the demonstration of high electro-optic activity by the unlinked compounds on their own. Linking limits post-alignment molecular mobility and thus increase the thermal and overall temporal stability of the electro-optic effect.

Figure 19A:
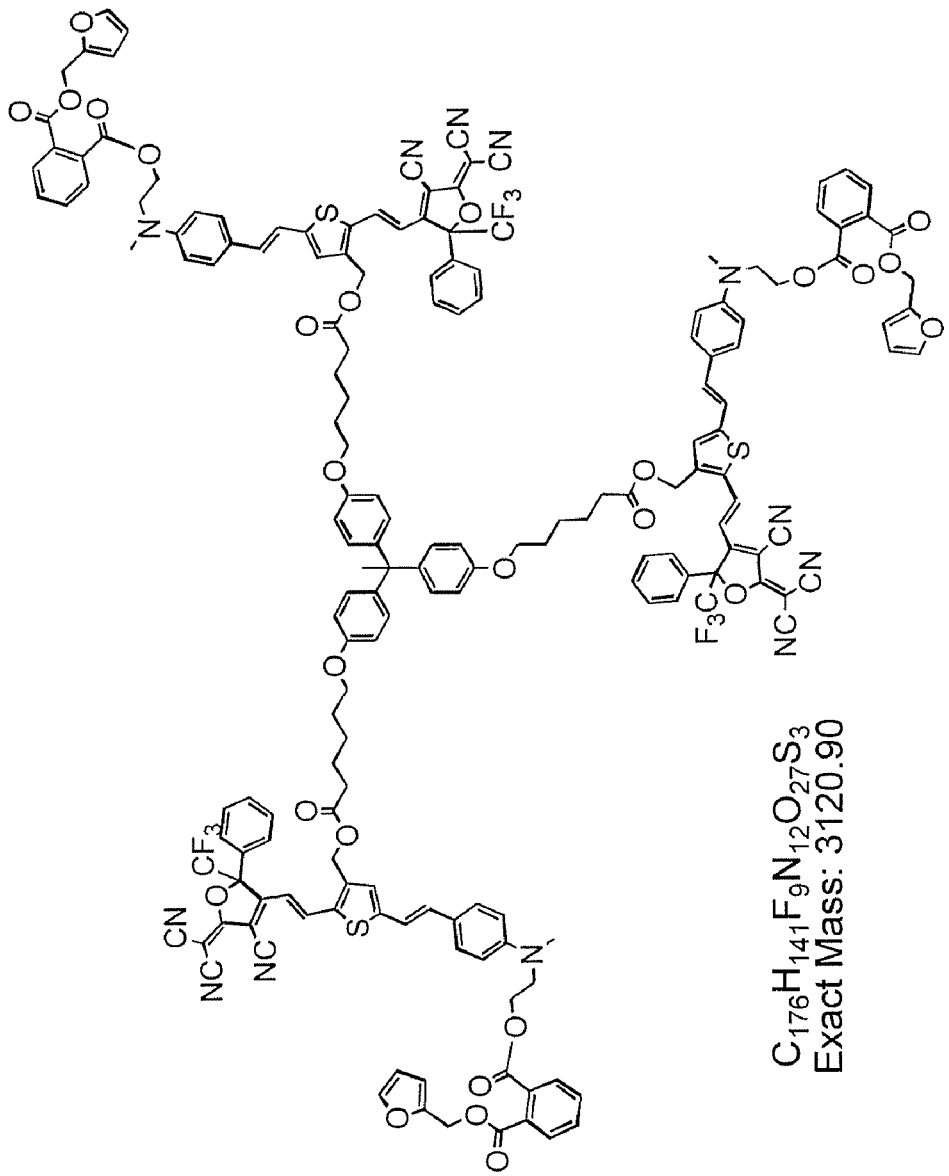
Figure 19B:
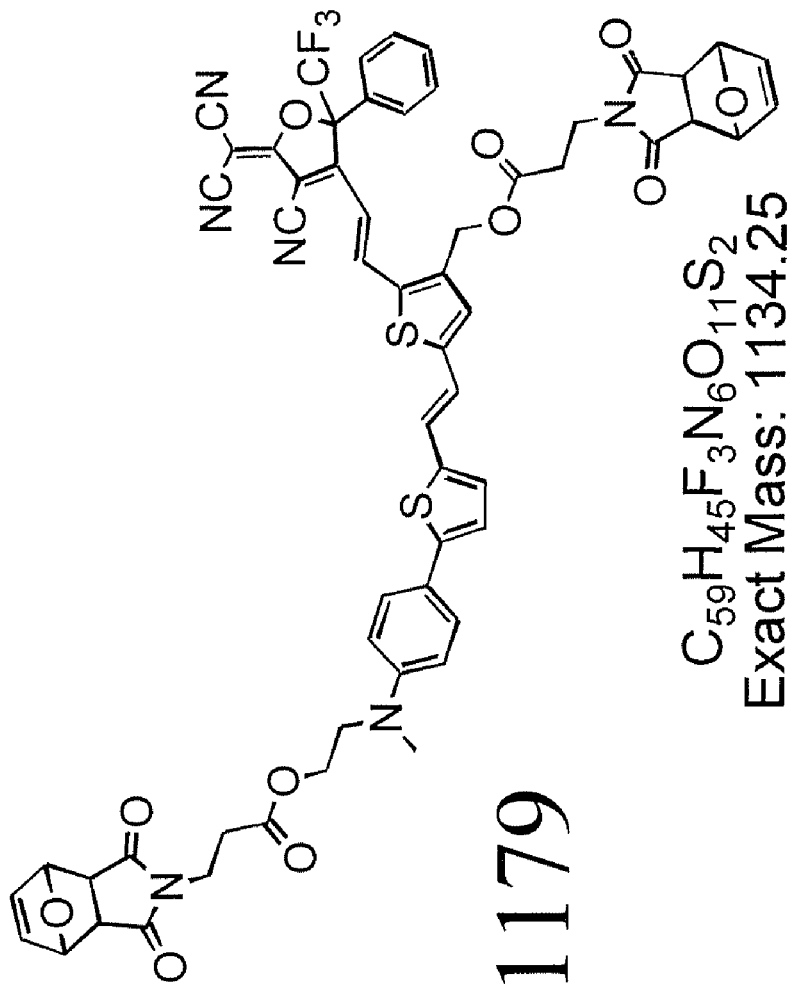

In the composites discussed here, linking is achieved either before, during, or after the poling process. In a representative embodiment, the timing of the linking process is controlled through the use of protecting groups that inhibit linking until dissociated or by timing the DA activation energy. The DA reaction takes place between a diene and dienophile pair. This pair can be selectively located in order to insure optimum reactivity and control. The system shown in FIGS. 19A and 19B depicts a representative DA linkable dendronized chromophore compound PSLD_57 (dendrons include diene moieties) (FIG. 19A) (prepared as described in Example 6) and chromophore compound AALD_1179 (donor and bridge groups include latent dienophile moieties) (FIG. 19B) (prepared as described in Example 7).

A dienophile that is initially deactivated by a furan protecting group can be used to limit linking until after the chromophore alignment process is completed. Deprotection of this group typically occurs near 120° C. in representative composites. Upon cooling, extensive Diels-Alder linking occurs between the dendronized chromophore compound and the chromophore compound. As determined by differential scanning calorimetry (DSC), the post-poling, post-linking $T_g$ was 110° C., a great improvement over the pre-linked glass transition temperature (corresponding to PSLD_57) of 85° C.

Figure 22:
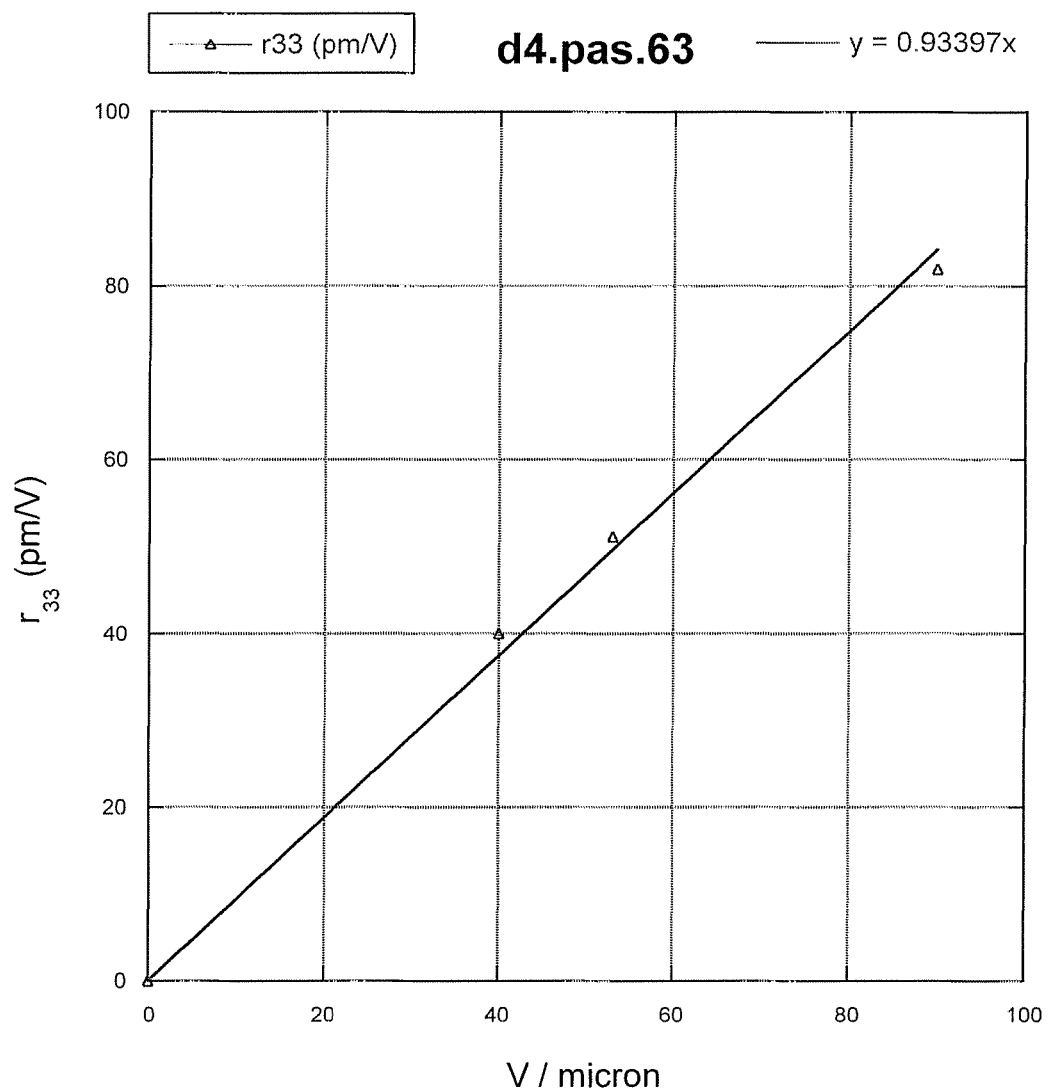
FIGS. 22-23 are graphs illustrating the electrostatic poling of representative dendronized chromophore compounds useful in the composite of the invention.

Electric field poling induced electro-optic activity of the stoichiometrically equal PSLD_57/AALD_1179 composite was investigated using in-situ reflection ellipsometry. The resulting data were plotted as a function of applied electric field and as illustrated in FIG. 22. An $r_{33}$ of approximately 83 pm/V can be achieved limited by high sample conductivity.

Figure 20A:
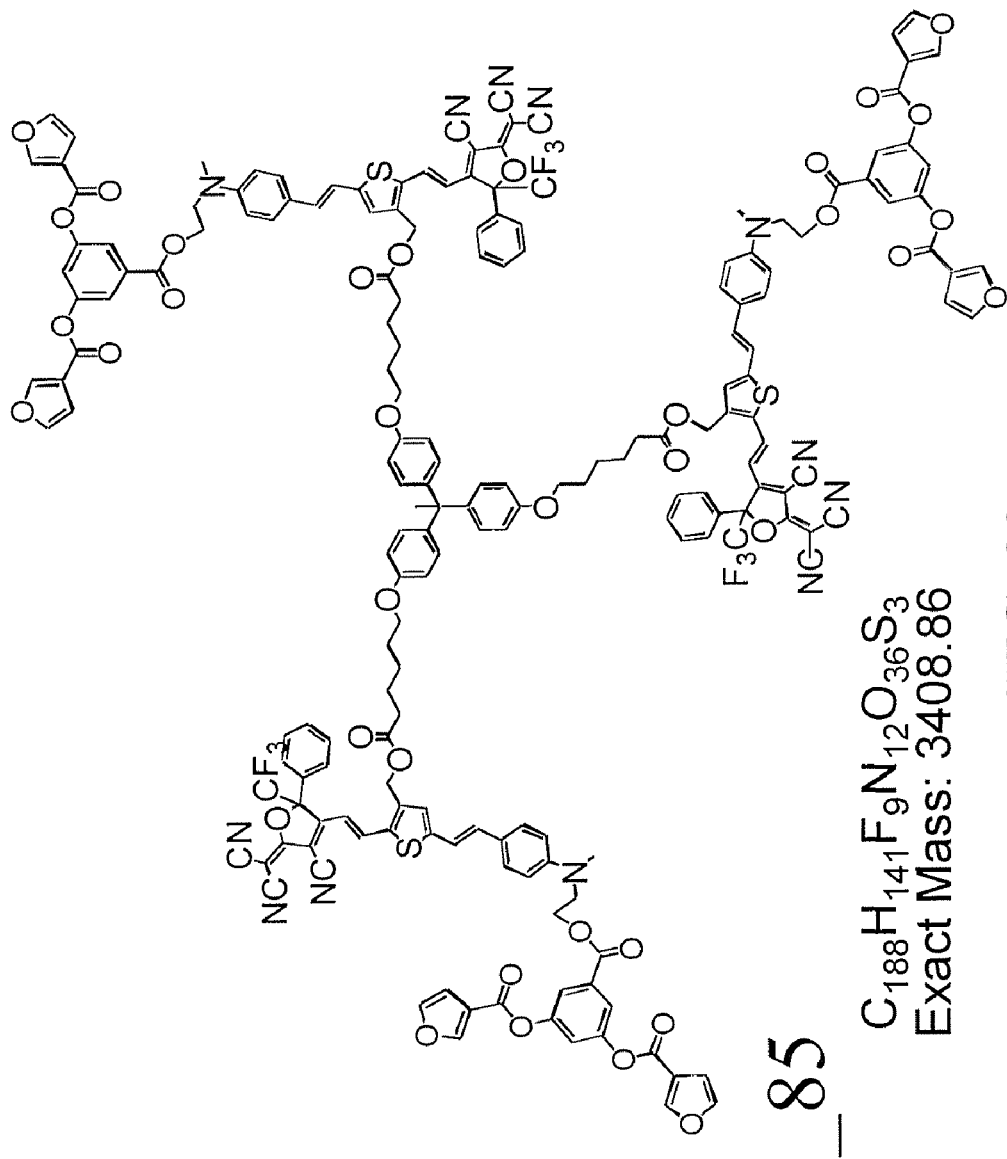
Figure 20B:
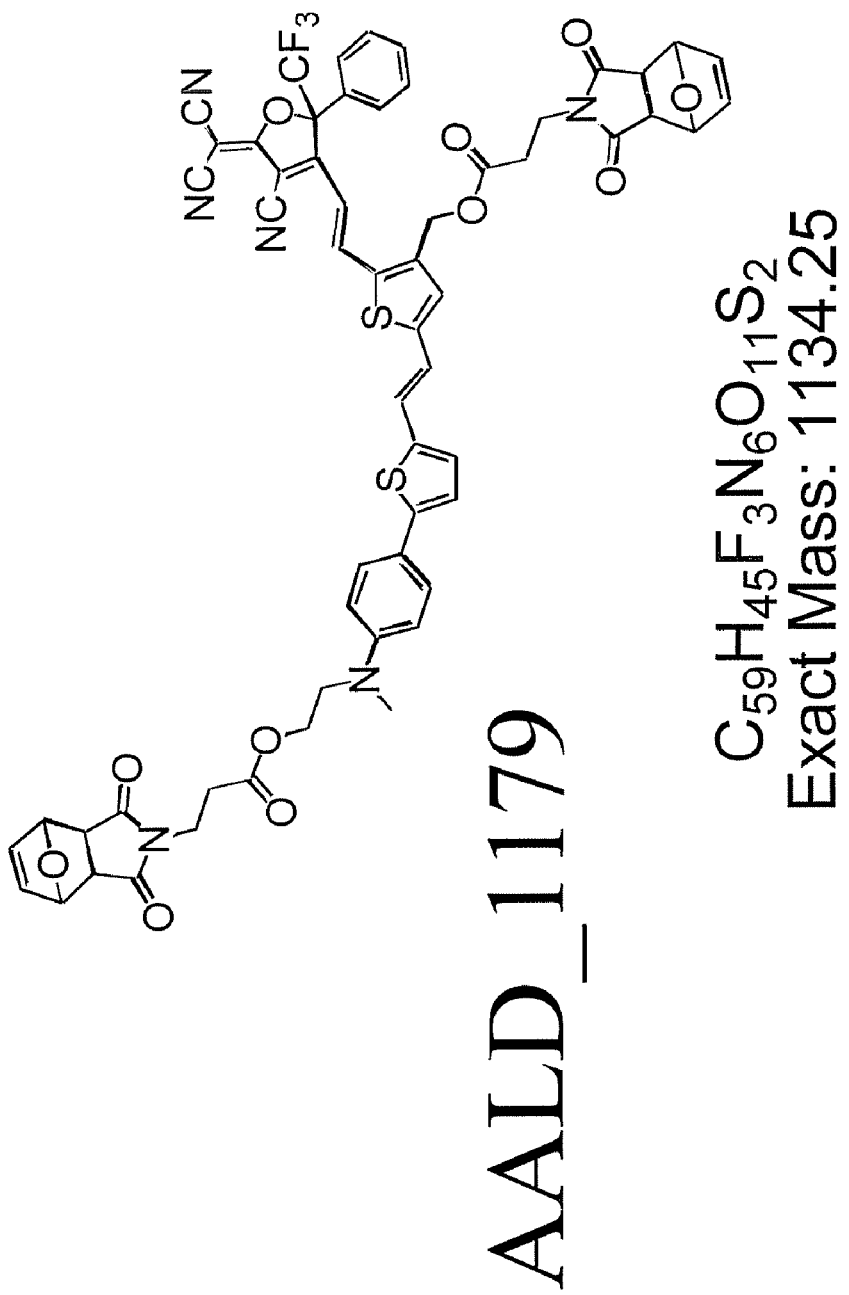
Figure 20C:
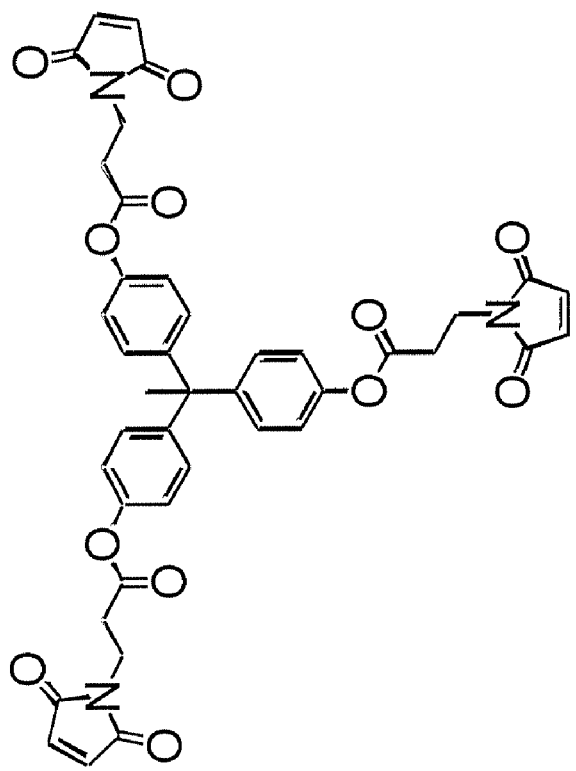

In order to optimize the degree of crosslinking and achieve high thermal stability while maintaining high poling efficiency, the initial material $T_g$ can be tuned to correspond to the activation energy requirements of the Diels-Alder reaction. Timing of the $T_g$ can be accomplished by adding a pre-linking compound to the composite to allow some linking to occur prior to the poling procedure. This technique allows improved material mechanical strength, lower conductivity, and higher solvent resistance prior to poling. These features make this an attractive technique. FIGS. 20A-20C illustrate a system that can be tuned in this manner. Referring to FIG. 20C, the dienophile pre-linker PAS_92 is allowed to react partially with the diene-containing PSLD_85 (FIG. 20A) (prepared as described in Example 6). When the temperature of the system is increased beyond the point that the capped maleimide dissociates from AALD_1179 (FIG. 20B) yielding a dienophilic species, the linking further progresses between PSLD_85 and AALD_1179 via the DA reaction.

Figure 23:
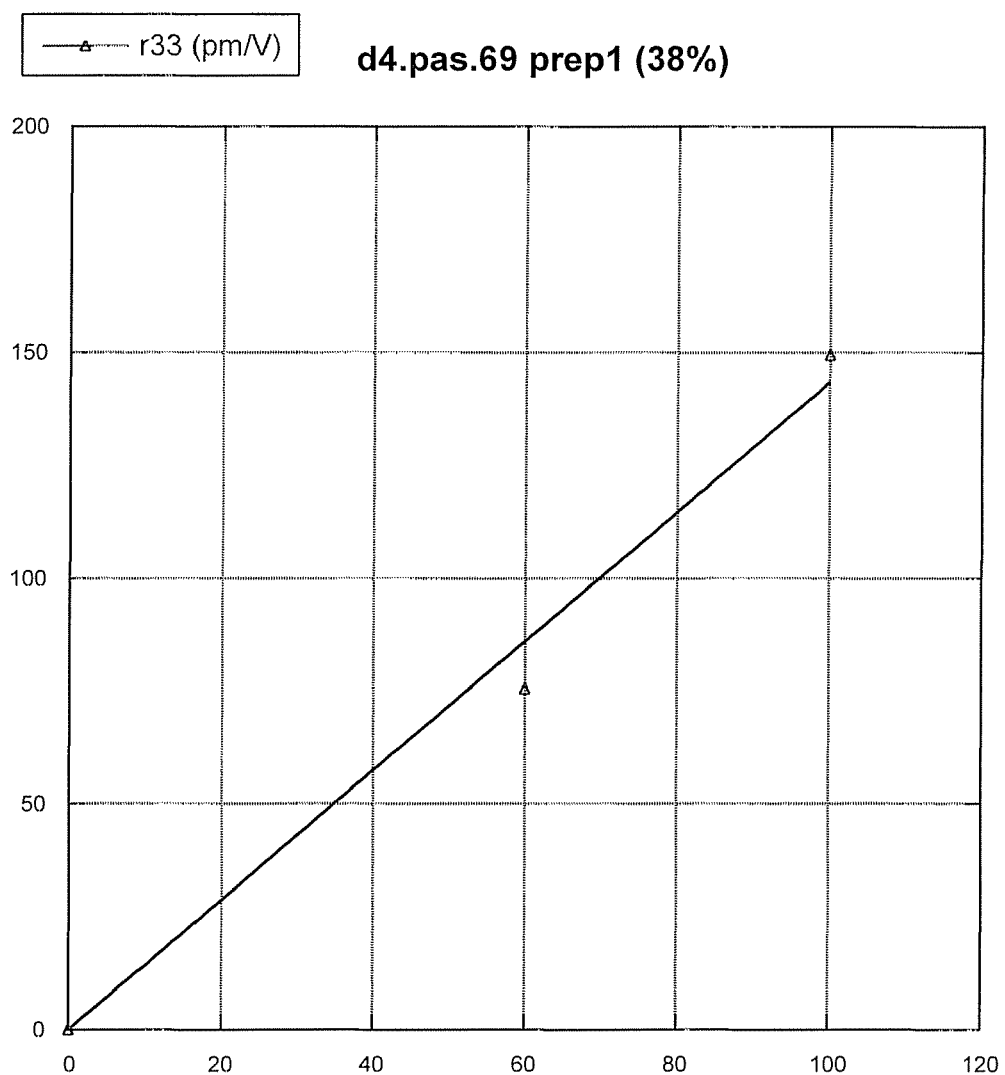

Dendrimer PSLD_85 is extremely similar to PSLD_57 (FIG. 19A) except for the use of a di-functional external dendron incorporating a furan-based diene that is ester functionalized at the three position in PSLD_85. The electron withdrawing nature of this ester functionalization increases the activation energy of the retro-Diels-Alder reaction, increasing the thermal stability of the system. The optically inert pre-linker PAS_92 can be added to adjust $T_g$ to an appropriate range for the Diels-Alder reaction to occur, and allow higher solvent resistance and mechanical stability during the device fabrication processes. The poling data for the PSLD_85/AALD_1179/PAS_92 composite, is illustrated in FIG. 23.

Figure 24:
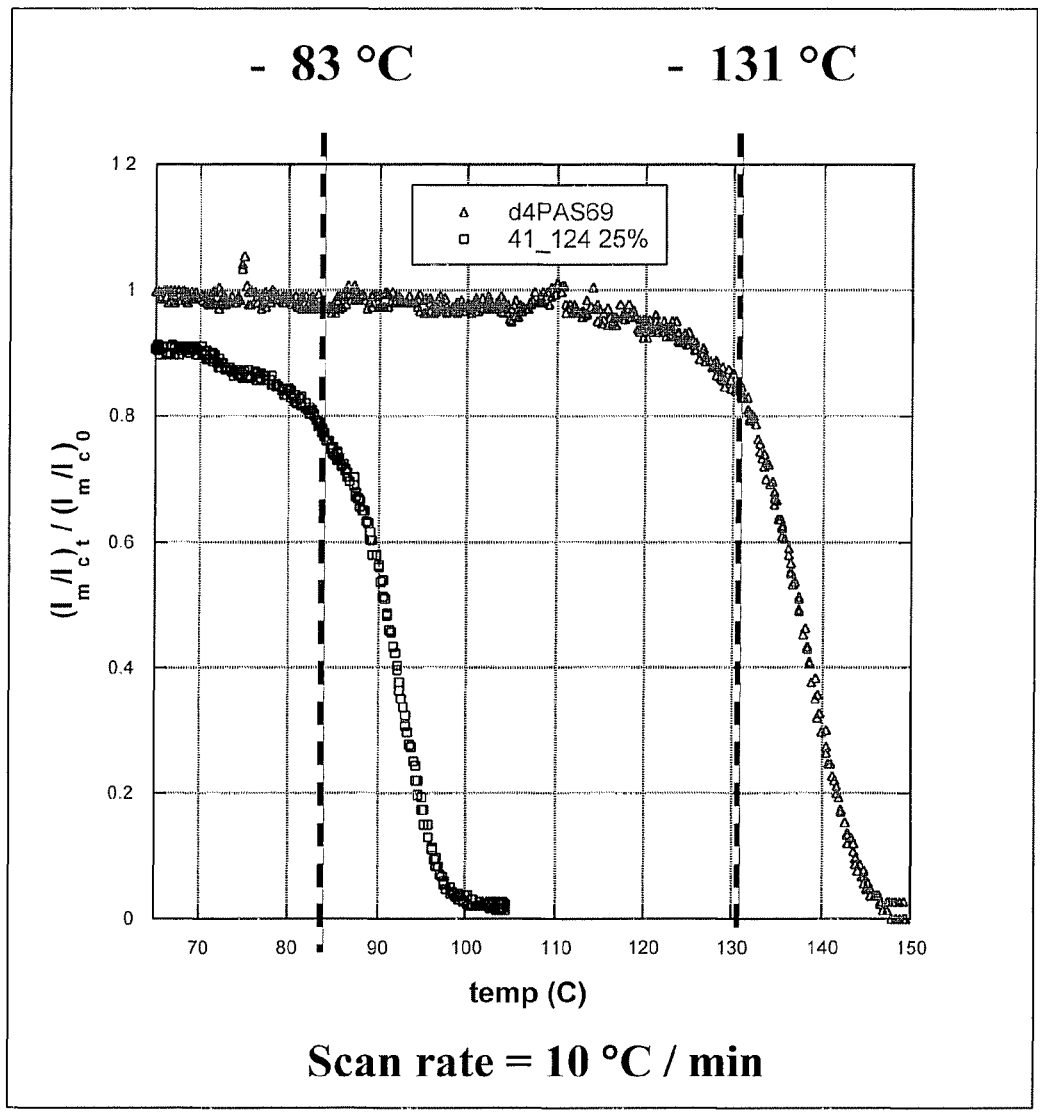
FIG. 24 is a graph illustrating the thermal stability of representative composites of the invention.

The optimization of composite properties can improved the poling process. The three-component composite has an $r_{33}$ of 150 pm/V using a lower active chromophore loading density than the previously outlined two component systems. Decreased chromophore loading should help improve optical loss characteristics. The three-component system also has improved thermal stability after poling due to the optimization of the linking process. Dynamic thermal stabilities up to 130° C. were recorded for this system, as illustrated in FIG. 24, using reflection ellipsometry and the decay rollover of the electro-optic phase modulation. In FIG. 24, the DA linked composite, shown as d4PAS69, has dramatically increased thermal stability compared to a similar, non-linked composite, shown as 41_124.

In the composites of the invention, the amount of chromophore compound in the host dendronized chromophore compound (i.e., chromophore density by weight percent) can vary depending on the chromophores used and the E-O properties desired. In one embodiment, the composite includes about 10 weight percent chromophore. In one embodiment, the composite include about 20 weight percent chromophore. In one embodiment, the composite include about 30 weight percent chromophore. In one embodiment, the composite include about 40 weight percent chromophore. In one embodiment, the composite include about 50 weight percent chromophore. In one embodiment, the composite include about 60 weight percent chromophore. In one embodiment, the composite include about 70 weight percent chromophore. In one embodiment, the composite include about 80 weight percent chromophore. In one embodiment, the composite include about 90 weight percent chromophore.

In another aspect, the present invention provides a method for forming an at least partially aligned chromophore composite, comprising:

depositing a chromophore composite onto a substrate, the composite comprising:

a chromophore compound having a π-electron donor group electronically conjugated to a π-electron acceptor group through π-electron bridge group, the compound having the formula:

$D_1$-$\pi_1$-$B_1$-$\pi_2$-$A_1$ wherein $D_1$ is a π-electron donor group, $B_1$ is a π-electron bridge group, $A_1$ is a π-electron acceptor group, $\pi_1$ is a π bridge electronically conjugating $D_1$ to $B_1$, $\pi_2$ is a π bridge electronically conjugating $B_1$ to $A_1$, wherein $\pi_1$ and $\pi_2$ may each be present or absent; and a dendronized chromophore compound having a π-electron donor group electronically conjugated to a π-electron acceptor group through π-electron bridge group, the compound having the formula:

$D_2$-$\pi_3$-$B_2$-$\pi_4$-$A_2$ wherein $D_2$ is a π-electron donor group, $B_2$ is a π-electron bridge group, $A_2$ is a π-electron acceptor group, $\pi_3$ is a π bridge electronically conjugating $D_2$ to $B_2$, $\pi_3$ is a π bridge electronically conjugating $B_2$ to $A_2$, wherein $\pi_3$ and $\pi_4$ may each be present or absent, wherein one or more of the donor, bridge, or acceptor groups is substituted with a dendron; wherein $D_1$ and $D_2$ are the same or different, $B_1$ and $B_2$ are the same or different, $A_1$ and $A_2$ are the same or different; and $\pi_1$, $\pi_2$, $\pi_3$, and $\pi_4$ are the same or different;

subjecting the composite to a temperature that is equal to or greater than the glass transition temperature of the composite; applying an aligning force to the composite; and reducing the temperature of the composite below the glass transition temperature of the chromophore composite to provide a hardened, at least partially aligned chromophore composite.

A representative embodiment of this method includes dissolving the chromophore compound and the dendronized chromophore compound in a suitable solvent, as previously described; spin-coating the solvated compounds onto a suitable substrate, such as glass, semiconductor, or metal; evaporating any remaining solvent to provide a composite (or film); heating the composite at or above the glass transition temperature of the composite, applying an electric field (i.e., poling); and cooling the composite below the glass transition temperature of the composite. This is only a representative method and many variations are possible in each step. For example, a composite could be deposited from the solid phase by evaporation; the composite could be deposited at a temperature above the glass transition temperature of the composite, thus eliminating the heating requirement; or a magnetic or molecular (e.g., self-assembly) force could be used as an aligning force.

In one embodiment, the aligning force comprises an electric field. A representative field is between 0.2 MV/cm and 1.5 MV/cm. Corona poling can also be used as a means for electrostatic poling. Poling techniques are well known to those skilled in the art.

When a chromophore film is at least partially aligned, some of the individual chromophore molecules within the film will be non-centrosymmetrically aligned. The direction of alignment in a representative film will have a relationship to the aligning force. In one representative embodiment, the chromophore molecules will align in the direction of an electric poling field.

In another aspect, the present invention provides a method for forming an at least partially aligned, linked chromophore composite, comprising:

depositing a composite onto a substrate, the composite comprising:

a chromophore compound having a π-electron donor group electronically conjugated to a π-electron acceptor group through π-electron bridge group, the compound having the formula:

$D_1$-$\pi_1$-$B_1$-$\pi_2$-$A_1$ wherein $D_1$ is a π-electron donor group, $B_1$ is a π-electron bridge group, $A_1$ is a π-electron acceptor group, $\pi_1$ is a π bridge electronically conjugating $D_1$ to $B_1$, $\pi_2$ is a π bridge electronically conjugating $B_1$ to $A_1$, wherein $\pi_1$ and $\pi_2$ may each be present or absent; and a dendronized chromophore compound having a π-electron donor group electronically conjugated to a π-electron acceptor group through π-electron bridge group, the compound having the formula:

$D_2$-$\pi_3$-$B_2$-$\pi_4$-$A_2$ wherein $D_2$ is a π-electron donor group, $B_2$ is a π-electron bridge group, $A_2$ is a π-electron acceptor group, $\pi_3$ is a π bridge electronically conjugating $D_2$ to $B_2$, $\pi_3$ is a π bridge electronically conjugating $B_2$ to $A_2$, wherein $\pi_3$ and $\pi_4$ may each be present or absent, wherein one or more of the donor, bridge, or acceptor groups is substituted with a dendron; wherein $D_1$ and $D_2$ are the same or different, $B_1$ and $B_2$ are the same or different, $A_1$ and $A_2$ are the same or different; and $\pi_1$, $\pi_2$, $\pi_3$, and $\pi_4$ are the same or different, and wherein the chromophore compound and the dendronized chromophore compound each includes a functional group reactive toward one another for covalently coupling (i.e. linking) the chromophore compound to the dendronized chromophore compound;

subjecting the composite to a temperature equal to a greater than the glass transition temperature of the composite; applying an aligning force to the composite to provide an at least partially aligned chromophore composite; subjecting the at least partially aligned chromophore composite to the conditions needed to create a linkage between the chromophore compound and the dendronized chromophore compound (i.e. covalently couple the chromophore compound to the dendronized chromophore compound), to provide an at least partially aligned, linked chromophore composite; and reducing the temperature below the glass transition temperature of the at least partially aligned, linked chromophore composite to provide a hardened, at least partially aligned, linked chromophore composite.

In one embodiment, the chromophore compound and the dendrimer compound are covalently coupled to form a linkage. In a representative embodiment, this linkage is formed by a 4+2 cycloaddition by cooling the composite from an elevated temperature. In a representative embodiment, at the glass transition temperature of the composite the 4+2 cycloaddition does not occur, but as the temperature of the composite cools, the reaction proceeds, thus creating the linkage. The initiation of the linkage is not limited to a temperature related event, and can also be caused by other sources, such as radiation (e.g., ultraviolet light) or a separate chemical reaction.

To better understand the present invention, the following definitions are provided. In general, all technical and scientific terms used herein have the same meaning as commonly understood to one of skill in the art to which this invention belongs, unless clearly indicated otherwise. For clarification, listed below are definitions for certain terms used herein relating to embodiments of the present invention. These definitions apply to the terms as they are used throughout this specification, unless otherwise clearly indicated.

As used herein the singular forms "a," "and," and "the" include plural referents unless the context clearly dictates otherwise. For example, "a group" refers to one or more of such groups, while "a chromophore" includes a particular chromophore as well as other family members and equivalents thereof as known to those skilled in the art.

Both substituent groups and molecular moieties are sometimes represented herein with symbols (e.g., R, $R^1$, π, $\pi^1$, $\pi^2$, D, and A). When the phrase "independently at each occurrence" refers to a symbol, that symbol may represent different actual substituent groups or molecular moieties every time the symbol appears in a formula. For example, the structure below, when described by "wherein R independently at each occurrence is methyl or hydrogen," would correspond to phenol as wells as several methyl substituted phenols including 2-methyl phenol, 3-methyl phenol, 3,4-dimethylphenol, and 2,4,6-trimethylphenol.

"Nonlinear" when used in the context of optical phenomenon pertains to second order effects. Such second order, or nonlinear, effects typically arise from a "push-pull" chromophore (i.e., a compound having the formula D-π-B-π-A).

"Electro-optic" (E-O) pertains to altering optical properties of a material by the occurrence of an electric field.

"Electronic" when used to refer to chemical structures and molecules, as opposed to electro-optic devices and components, pertains to electrons in a molecule or on an atom.

"Electric" pertains to electricity and electrical phenomena arising from applied voltages.

"Temporal stability" refers to long-term retention of a particular property. Temporal stability may be affected by any factor that modifies changes in either intermolecular order or intramolecular chemical stricture.

A "π-electron bridge group" or "conjugated bridge" (represented in chemical structures by "π") is comprised of an atom or group of atoms through which electrons can be delocalized from an electron donor group (D) to an electron acceptor (A) through the orbitals of atoms in the bridge group. Preferably, the orbitals will be p-orbitals on multiply bonded carbon atoms such as those found in alkenes, alkynes, neutral or charged aromatic rings, and neutral or charged heteroaromatic ring systems. Additionally, the orbitals can be p-orbitals on multiply bonded atoms such as boron or nitrogen or organometallic orbitals. The atoms of the bridge that contain the orbitals through which the electrons are delocalized are referred to here as the "critical atoms." The number of critical atoms in a bridge can be a number from 1 to about 30. The critical atoms can also be substituted further with the following: "alkyl" as defined below, "aryl" as defined below, or "heteroalkyl" as defined below. One or more atoms, with the exception of hydrogen, on alkyl, aryl, or heteroalkyl substituents of critical atoms in the bridge may be bonded to atoms in other alkyl, aryl, or heteroalkyl substituents to form one or more rings.

"Donor coupling" or "π-bridge and/or donor coupling" describe the synthetic chemical step or steps known to those skilled in the art of covalently attaching a chemical group containing a donor to a selected chemical structure. The step maybe divided into multiple steps, wherein the first step covalently attaches π-bridge that is also reactive and the second step covalently attaches a donor group. Typically, the coupling involves either reacting a π-bridge or donor group containing a carbonyl with a selected chemical structure containing at least one acidic proton or reacting a π-bridge or donor group containing at least one acid proton with a selected chemical structure containing a reactive carbonyl group.

"Acceptor coupling" or "π-bridge and/or acceptor coupling" is the synthetic chemical step or steps known to those skilled in the art of covalently attaching a chemical group containing an acceptor to a selected chemical structure. The step maybe divided into multiple steps, wherein the first step covalently attaches a π-bridge that is also reactive and the second step covalently attaches an acceptor group. Typically, the coupling involves either reacting a π-bridge or acceptor group containing a carbonyl with a selected chemical structure containing at least one acidic proton or reacting a π-bridge or acceptor group containing at least one acid proton with a selected chemical structure containing a reactive carbonyl group.

As used herein, "R" refers to a substituent on an atom. Unless otherwise specifically assigned, R represents any single atom or any one of the substituent groups defined below. When there is more than one R in a molecule, the "R" may independently at each occurrence refer to a single atom or any one of the substituent groups defined below.

The composite and methods described herein can be useful in a variety of electro-optic applications. In addition, the composite and methods may be applied to polymer transistors or other active or passive electronic devices, as well as OLED (organic light emitting diode) or LCD (liquid crystal display) applications.

The use of organic polymers in integrated optics and optical communication systems containing optical fibers and routers has been previously described. The composites of the invention may be used in place of currently used materials, such as lithium niobate, in most type of integrated optics devices, optical computing applications, and optical communication systems. For instance, the composites may be fabricated into switches, modulators, waveguides, or other electro-optical devices.

For example, in optical communication systems devices fabricated from the composites according to the present invention may be incorporated into routers for optical communication systems or waveguides for optical communication systems or for optical switching or computing applications. Because the composites are generally less demanding than currently used materials, devices made from such composites may be more highly integrated, as described in U.S. Pat. No. 6,049,641, which is incorporated herein by reference. Additionally, such composites may be used in periodically poled applications as well as certain displays, as described in U.S. Pat. No. 5,911,018, which is incorporated herein by reference.

Techniques to prepare components of optical communication systems from optically transmissive materials have been previously described, and may be utilized to prepare such components from composites provided by the present invention. Many articles and patents describe suitable techniques, and reference other articles and patents that describe suitable techniques, where the following articles and patents are exemplary:

L. Eldada and L. Shacklette, "Advances in Polymer Integrated Optics," *IEEE Journal of Selected Topics in Quantum Electronics*, Vol. 6, No. 1, pp. 54-68 (January/February 2000); E. L. Wooten, et al. "A Review of Lithium Niobate Modulators for Fiber-Optic Communication Systems," *IEEE Journal of Selected Topics in Quantum Electronics*, Vol. 6, No. 1, pp. 69-82 (January/February 2000); F. Heismann, et al. "Lithium niobate integrated optics: Selected contemporary devices and system applications," *Optical Fiber Telecommunications III B*, Kaminow and Koch, eds. New York: Academic, pp. 377-462 (1997); E. Murphy, "Photonic switching," *Optical Fiber Telecommunications III B*, Kaminow and Koch, eds. New York: Academic, pp. 463-501 (1997); E. Murphy, *Integrated Optical Circuits and Components: Design and Applications*, New York: Marcel Dekker (August 1999); L. Dalton et al., "Polymeric Electro-optic Modulators: From Chromophore Design to Integration with Semiconductor Very Large Scale Integration Electronics and Silica Fiber Optics," *Ind. Eng. Chem. Res.*, Vol. 38, pp. 8-33 (1999); L. Dalton et al., "From molecules to opto-chips: organic electro-optic materials," *J Mater. Chem.*, Vol. 9, pp. 1905-1920

(1999); I. Liakatas et al., "Importance of intermolecular interactions in the nonlinear optical properties of poled polymers," *Applied Physics Letters*, Vol. 76, No. 11, pp. 1368-1370 (13 Mar. 2000); C. Cai et al., "Donor-Acceptor-Substituted Phenylethenyl Bithiophenes: Highly Efficient and Stable Nonlinear Optical Chromophores," *Organic Letters*, Vol. 1, No. 11 pp. 1847-1849 (1999); J. Razna et al., "NLO properties of polymeric Langmuir-Blodgett films of sulfonamide-substituted azobenzenes," *J. of Materials Chemistry*, Vol. 9, pp. 1693-1698 (1999); K. Van den Broeck et al., "Synthesis and nonlinear optical properties of high glass transition polyimides," *Macromol. Chem. Phys.* Vol. 200, pp. 2629-2635 (1999); H. Jiang, and A. Kakkar, "Functionalized Siloxane-Linked Polymers for Second-Order Nonlinear Optics," *Macromolecules*, Vol. 31, pp. 2501-2508 (1998); A. K.-Y. Jen, "High-Performance Polyquinolines with Pendent High-Temperature Chromophores for Second-Order Nonlinear Optics," *Chem. Mater*, Vol. 10, pp. 471-473 (1998); "Nonlinear Optics of Organic Molecules and Polymers," Hari Singh Nalwa and Seizo Miyata (eds.), CRC Press (1997); Cheng Zhang, Ph.D. Dissertation, University of Southern California (1999); Galina Todorova, Ph.D. Dissertation, University of Southern California (2000); U.S. Pat. Nos. 5,272,218; 5,276,745; 5,286,872; 5,288,816; 5,290,485; 5,290,630; 5,290,824; 5,291,574; 5,298,588; 5,310,918; 5,312,565; 5,322,986; 5,326,661; 5,334,333; 5,338,481; 5,352,566; 5,354,511; 5,359,072; 5,360,582; 5,371,173; 5,371,817; 5,374,734; 5,381,507; 5,383,050; 5,384,378; 5,384,883; 5,387,629; 5,395,556; 5,397,508; 5,397,642; 5,399,664; 5,403,936; 5,405,926; 5,406,406; 5,408,009; 5,410,630; 5,414,791; 5,418,871; 5,420,172; 5,443,895; 5,434,699; 5,442,089; 5,443,758; 5,445,854; 5,447,662; 5,460,907; 5,465,310; 5,466,397; 5,467,421; 5,483,005; 5,484,550; 5,484,821; 5,500,156; 5,501,821; 5,507,974; 5,514,799; 5,514,807; 5,517,350; 5,520,968; 5,521,277; 5,526,450; 5,532,320; 5,534,201; 5,534,613; 5,535,048; 5,536,866; 5,547,705; 5,547,763; 5,557,699; 5,561,733; 5,578,251; 5,588,083; 5,594,075; 5,604,038; 5,604,292; 5,605,726; 5,612,387; 5,622,654; 5,633,337; 5,637,717; 5,649,045; 5,663,308; 5,670,090; 5,670,091; 5,670,603; 5,676,884; 5,679,763; 5,688,906; 5,693,744; 5,707,544; 5,714,304; 5,718,845; 5,726,317; 5,729,641; 5,736,592; 5,738,806; 5,741,442; 5,745,613; 5,746,949; 5,759,447; 5,764,820; 5,770,121; 5,76,374; 5,776,375; 5,777,089; 5,783,306; 5,783,649; 5,800,733; 5,804,101; 5,807,974; 5,811,507; 5,830,988; 5,831,259; 5,834,100; 5,834,575; 5,837,783; 5,844,052; 5,847,032; 5,851,424; 5,851,427; 5,856,384; 5,861,976; 5,862,276; 5,872,882; 5,881,083; 5,882,785; 5,883,259; 5,889,131; 5,892,857; 5,901,259; 5,903,330; 5,908,916; 5,930,017; 5,930,412; 5,935,491; 5,937,115; 5,937,341; 5,940,417; 5,943,154; 5,943,464; 5,948,322; 5,948,915; 5,949,943; 5,953,469; 5,959,159; 5,959,756; 5,962,658; 5,963,683; 5,966,233; 5,970,185; 5,970,186; 5,982,958; 5,982,961; 5,985,084; 5,987,202; 5,993,700; 6,001,958; 6,005,058; 6,005,707; 6,013,748; 6,017,470; 6,020,457; 6,022,671; 6,025,453; 6,026,205; 6,033,773; 6,033,774; 6,037,105; 6,041,157; 6,045,888; 6,047,095; 6,048,928; 6,051,722; 6,061,481; 6,061,487; 6,067,186; 6,072,920; 6,081,632; 6,081,634; 6,081,794; 6,086,794; 6,090,322; and 6,091,879.

The foregoing references provide instruction and guidance to fabricate waveguides from materials generally of the types described herein using approaches such as direct photolithography, reactive ion etching, excimer laser ablation, molding, conventional mask photolithography, ablative laser writing, or embossing (e.g., soft embossing). The foregoing references also disclose electron acceptors, electron donors and electron bridges that may be incorporated into the compounds useful for making the composites of the invention.

Components of optical communication systems that may be fabricated, in whole or part, with composites according to the present invention include, without limitation, straight waveguides, bends, single-mode splitters, couplers (including directional couplers, MMI couplers, star couplers), routers, filters (including wavelength filters), switches, modulators (optical and electro-optical, e.g., birefringent modulator, the Mach-Zender interferometer, and directional and evanescent coupler), arrays (including long, high-density waveguide arrays), optical interconnects, optochips, single-mode DWDM components, and gratings. The composites described herein may be used with, for example, wafer-level processing, as applied in, for example, vertical cavity surface emitting laser (VCSEL) and CMOS technologies.

In many applications, the composites described herein may be used in lieu of lithium niobate, gallium arsenide, and other inorganic materials that currently find use as light-transmissive materials in optical communication systems.

The composites described herein may be used in telecommunication, data communication, signal processing, information processing, and radar system devices and thus may be used in communication methods relying, at least in part, on the optical transmission of information. Thus, a method according to the present invention may include communicating by transmitting information with light, where the light is transmitted at least in part through a material including a composites of the invention.

The composites of the present invention can be incorporated into various electro-optical devices. Accordingly, in another aspect, the invention provides electro-optic devices including the following:

an electro-optical device comprising a composite of the present invention;

a waveguide comprising a composite of the present invention;

an optical switch comprising a composite of the present invention;

an optical modulator comprising a composite of the present invention;

an optical coupler comprising a composite of the present invention;

an optical router comprising a composite of the present invention;

a communications system comprising a composite of the present invention;

a method of data transmission comprising transmitting light through or via a composite of the present invention;

a method of telecommunication comprising transmitting light through or via a composite of the present invention;

a method of transmitting light comprising directing light through or via a composite of the present invention;

a method of routing light through an optical system comprising transmitting light through or via a composite of the present invention;

an interferometric optical modulator or switch, comprising: (1) an input waveguide; (2) an output waveguide; (3) a first leg having a first end and a second end, the first leg being coupled to the input waveguide at the first end and to the output waveguide at the second end; and 4) and a second leg having a first end and a second end, the second leg being coupled to the input waveguide at the first end and to the output waveguide at the second end, wherein at least one of the first and second legs includes a composite of the present invention;

an optical modulator or switch, comprising: (1) an input; (2) an output; (3) a first waveguide extending between the input and output; and (4) a second waveguide aligned to the first waveguide and positioned for evanescent coupling to the first waveguide; wherein at least one of the first and second legs includes a composite of the present invention. The modulator or switch may further including an electrode positioned to produce an electric field across the first or second waveguide;

an optical router comprising a plurality of switches, wherein each switch includes: (1) an input; (2) an output; (3) a first waveguide extending between the input and output; and (4) a second waveguide aligned to the first waveguide and positioned for evanescent coupling to the first waveguide; wherein at least one of the first and second legs includes a composite of the present invention. The plurality of switches may optionally be arranged in an array of rows and columns.

The present invention provides dendronized chromophore compounds (e.g., electro-optic dendrimers including dendronized chromophores and multi-arm dendrimers) that act as nonlinear optically active host materials having intrinsic electro-optic coefficients around 100-120 pm/V. By doping these dendronized chromophore compounds with chromophore compounds, the dielectric strength of resulting composite (e.g., chromophoric monolithic glasses formed from these materials) is significantly improved compared to the individual components. The poled components exhibit electro-optic coefficients up to 210-310 pm/V at 1310 nm. The composites of the invention overcome the dielectric, conductivity, and compatibility mismatches between chromophores and matrices of typical electro-optic polymers having passive (i.e., non-chromophore containing) polymers as the hosts or backbones. The present invention provides composites having elevated poling efficiency and performance reproducibility of organic electro-optic materials.

The following examples are provided for the purpose of illustrating, not limiting, the invention.

EXAMPLES

Example 1

General Procedures

Acetone and tetrahydrofuran (THF) were distilled over phosphorus pentoxide and sodium benzophenone ketyl, respectively, under nitrogen prior to use. 3,5-Bis(benzyloxy)benzoic acid, 3,5-bis(2,3,4,5,6-pentafluorobenzoate)benzoic acid, and 4-(dimethylamino)pyridinium-4-toluenesulfonate (DPTS) were prepared according to the methods described in the literature. All the other chemicals were purchased from Aldrich and were used as received. All reactions were carried out under inert nitrogen atmosphere unless otherwise specified. $^1$H NMR spectra (300 MHz) were taken on a Bruker AV-301 spectrometer. UV/vis spectra were obtained on a Perkin-Elmer Lambda-9 spectrophotometer. Glass transition temperatures ($T_g$) were measured by differential scanning calorimetry (DSC) using a DSC2010 in TA instruments with a heating rate of 10° C./min.

Example 2

The Preparations of Representative Dendronized Chromophore Compounds: HD-HD, HD-FD, FD-HD, and FD-FD The preparations of representative dendronized chromophore compounds (HD-HD, HD-FD, FD-HD, and FD-FD) are described below and illustrated schematically in FIG. 2.

Preparation of compound ii. To a solution of i (0.39 mmol), ROH (0.60 mmol), and DPTS (0.068 mmol) in 15 mL of THF was added dicyclohexylcarbodiimide (0.68 mmol). The reaction mixture was allowed to stir at room temperature for 6 h under the nitrogen atmosphere. After filtration of the resultant urea, all the solvent was evaporated under reduced pressure. The crude product was purified by column chromatography using ethyl acetate and hexane (1:2, by volume) as an eluent to afford ii as blue solid (87%).

Preparation of compound iii. To a cooled solution of ii (0.49 mmol) in 20 mL of $CH_2Cl_2$ under the nitrogen, 1.5 mL of bromotrimethylsilane was added dropwise. The reaction mixture was stirred at −20° C. for 2.5 h, and then neutralized with 50 mL of saturated aqueous sodium bicarbonate solution. The residue was partitioned between water and $CH_2Cl_2$, and extracted. The combined extracts were dried over sodium sulfate. The crude product was purified by column chromatography using ethyl acetate and hexane (3:2, by volume) to obtain iii as a blue-greenish solid (83%).

Preparation of compound iv. Compound iv was synthesized by a procedure similar to that described above for compound ii using 0.49 mmol of iii and 0.74 mmol of R'OH. The crude product was purified by column chromatography using $CH_2Cl_2$ and ethyl acetate (3:1, by volume) as the eluent to afford HD-HD, HD-FD, FD-HD, and FD-FD as blue-greenish solids. (88%)

HD-HD. $^1$H NMR (CDCl$_3$, TMS, ppm): δ 8.10 (d, J=15.3 Hz, 1H), 7.50 (s, 1H), 7.45 (d, J=8.7 Hz, 2H), 7.42-7.33 (m, 20H), 7.27 (s, 2H), 7.25 (s, 2H), 7.08 (d, J=15.6 Hz, 1H), 7.01 (d, J=15.6 Hz, 1H), 6.80 (s, 1H), 6.75 (d, J=8.7 Hz, 2H), 6.69 (s, 1H), 6.55 (d, J=15.3 Hz, 1H), 5.39 (s, 2H), 5.15 (s, 4H), 4.49 (t, J=6.3 Hz, 2H), 3.81 (t, J=6.9 Hz, 2H), 3.56 (q, J=7.2 Hz, 2H), 1.96 (s, 3H), 1.27 (t, J=7.2 Hz, 3H). $\lambda_{max}$: 667 nm in a solution of 1,4-dioxane. $T_g$=58° C.

HD-FD. $^1$H NMR (CDCl$_3$, TMS, ppm): δ 8.11 (d, J=15.3 Hz, 1H), 7.55 (s, 1H), 7.46 (d, J=8.7 Hz, 2H), 7.41-7.37 (m, 10H), 7.23 (s, 2H), 7.22 (s, 2H), 7.19 (d, J=15.6 Hz, 1H), 7.10 (d, J=15.6 Hz, 1H), 6.81 (s, 1H), 6.77 (d, J=8.7 Hz, 2H), 6.71 (s, 1H), 6.55 (d, J=15.3 Hz, 1H), 5.39 (s, 2H), 5.10 (s, 2H), 5.05 (s, 2H), 4.49 (t, J=6.3 Hz, 2H), 3.76 (t, J=6.9 Hz, 2H), 3.53 (q, J=7.2 Hz, 2H), 1.99 (s, 3H), 1.28 (t, J=7.2 Hz, 3H). $\lambda_{max}$: 671 nm in a solution of 1,4-dioxane. $T_g$=71° C.

FD-HD. $^1$H NMR (CDCl$_3$, TMS, ppm): δ 8.11 (d, J=15.3 Hz, 1H), 7.51 (s, 1H), 7.43 (d, J=8.7 Hz, 2H), 7.39-7.30 (m, 10H), 7.28 (s, 2H), 7.22 (s, 2H), 7.19 (d, J=15.6 Hz, 1H), 7.06 (d, J=15.6 Hz, 1H), 6.80 (m, 3H), 6.70 (s, 1H), 6.53 (d, J=15.3 Hz, 1H), 5.42 (s, 2H), 5.09 (s, 4H), 4.53 (t, J=6.3 Hz, 2H), 3.72 (t, J=6.9 Hz, 2H), 3.50 (q, J=7.2 Hz, 2H), 1.96 (s, 3H), 1.30 (t, J=7.2 Hz, 3H). $\lambda_{max}$: 661 nm in a solution of 1,4-dioxane. $T_g$=68° C.

FD-FD. $^1$H NMR (CDCl$_3$, TMS, ppm): δ 8.12 (d, J=15.3 Hz, 1H), 7.57 (s, 1H), 7.45 (d, J=8.7 Hz, 2H), 7.32 (s, 2H), 7.25 (s, 2H), 7.20 (d, J=15.6 Hz, 1H), 7.05 (d, J=15.6 Hz, 1H), 6.80 (d, J=8.7 Hz, 2H), 6.77 (s, 1H), 6.69 (s, 1H), 6.51 (d, J=15.3 Hz, 1H), 5.45 (s, 2H), 5.19 (s, 2H), 5.06 (s, 2H), 4.53 (t, J=6.3 Hz, 2H), 3.83 (t, J=6.9 Hz, 2H), 3.53 (q, J=7.2 Hz, 2H), 1.99 (s, 3H), 1.29 (t, J=7.2 Hz, 3H). $\lambda_{max}$: 655 nm in a solution of 1,4-dioxane. $T_g$=75° C.

Example 3

The Preparation of a Representative Chromophore Compound: AJC146

Figure 5:
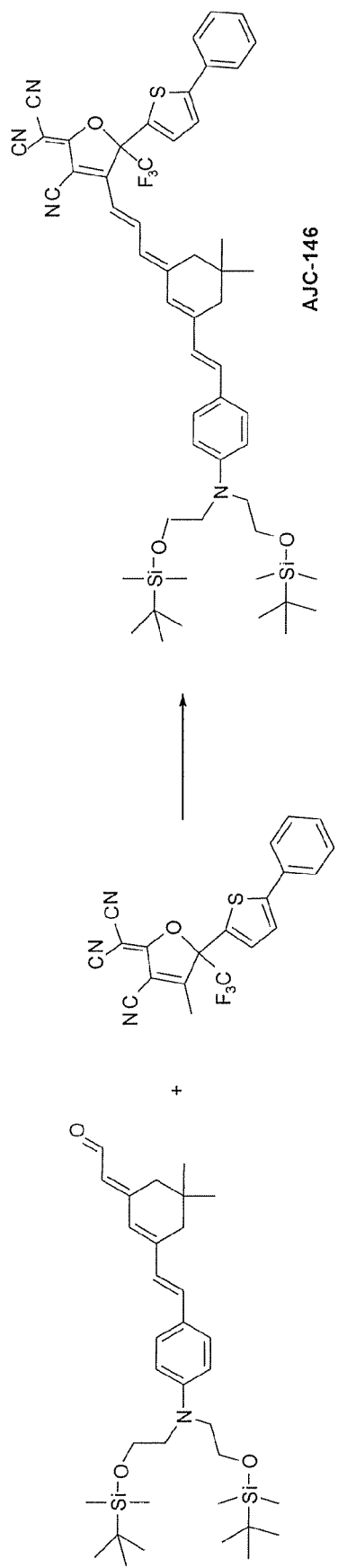
FIG. 5 illustrates the synthesis of a representative nonlinear optically active chromophore compound useful in the composite of the invention.
Figure 6:
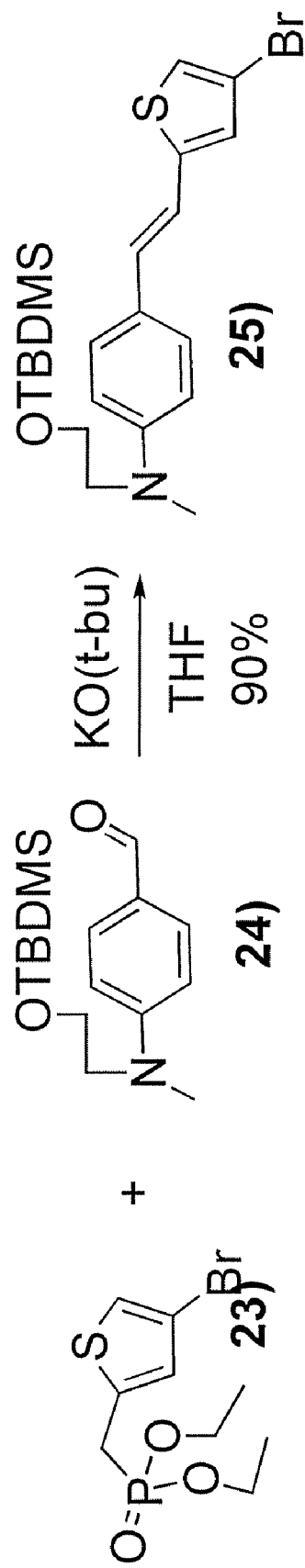
FIGS. 6-16 illustrate the synthesis of a representative dendronized chromophore compound useful in the composite of the invention.
Figure 7:
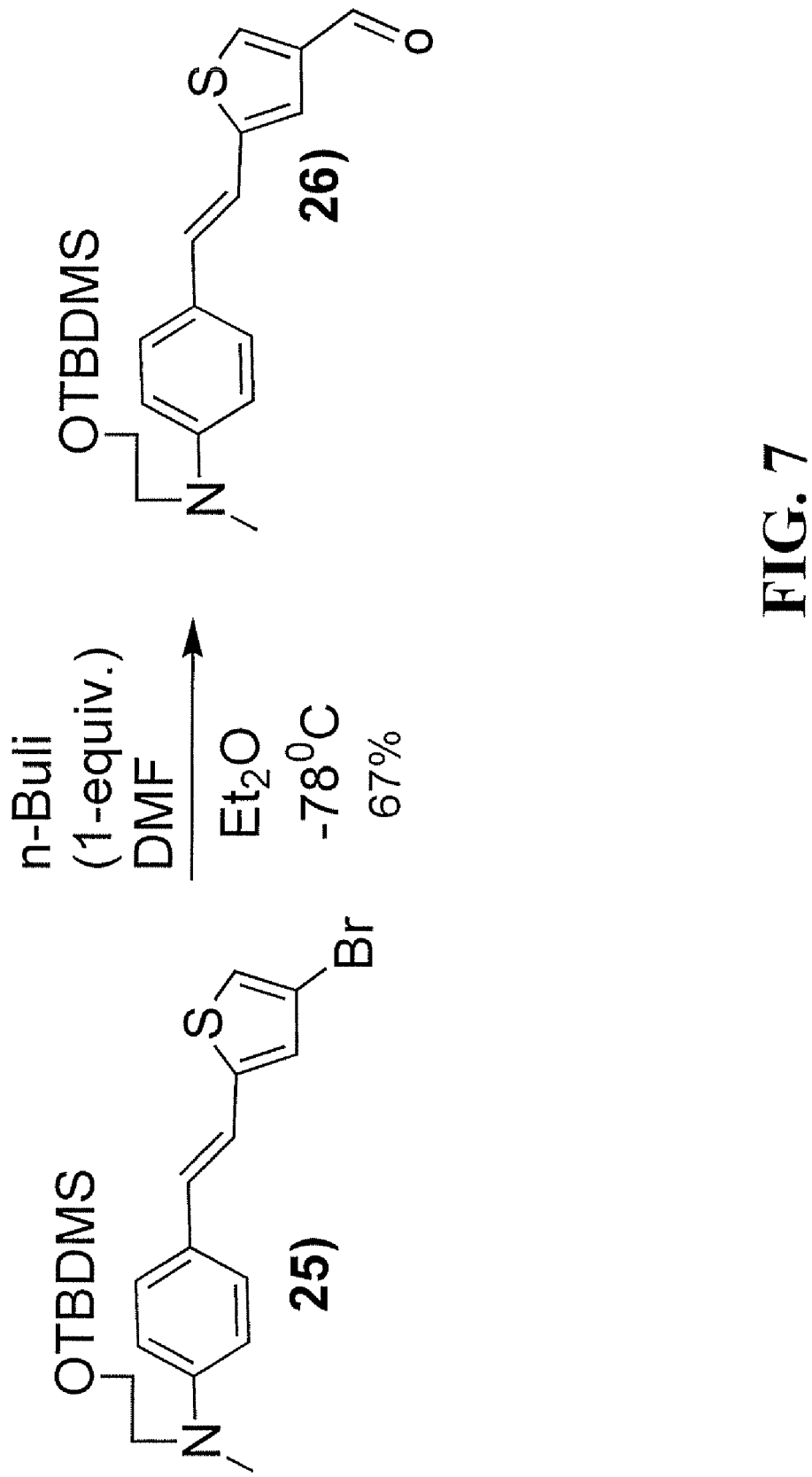
Figure 8:
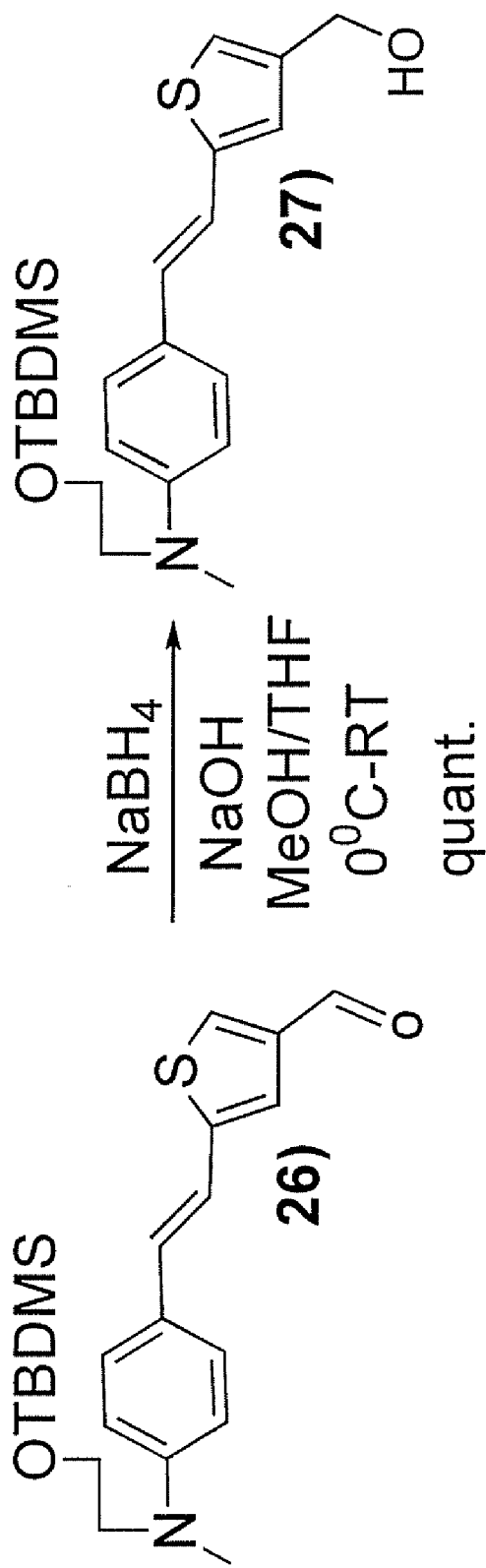
Figure 9:
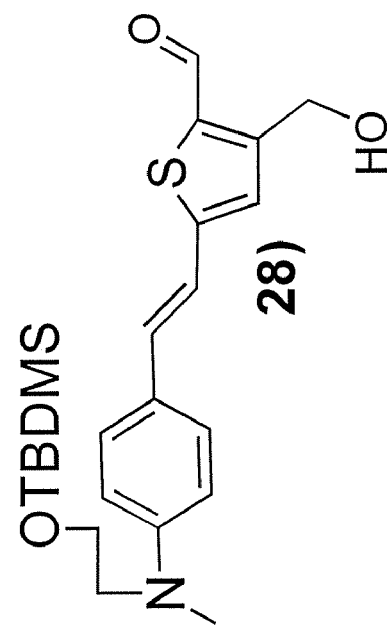
Figure 9:
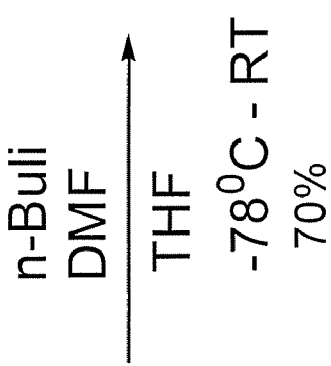
Figure 9:
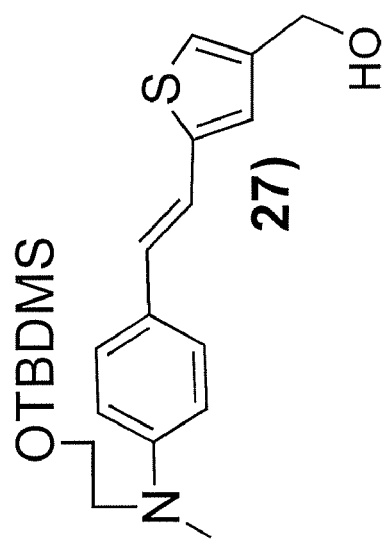
Figure 10:
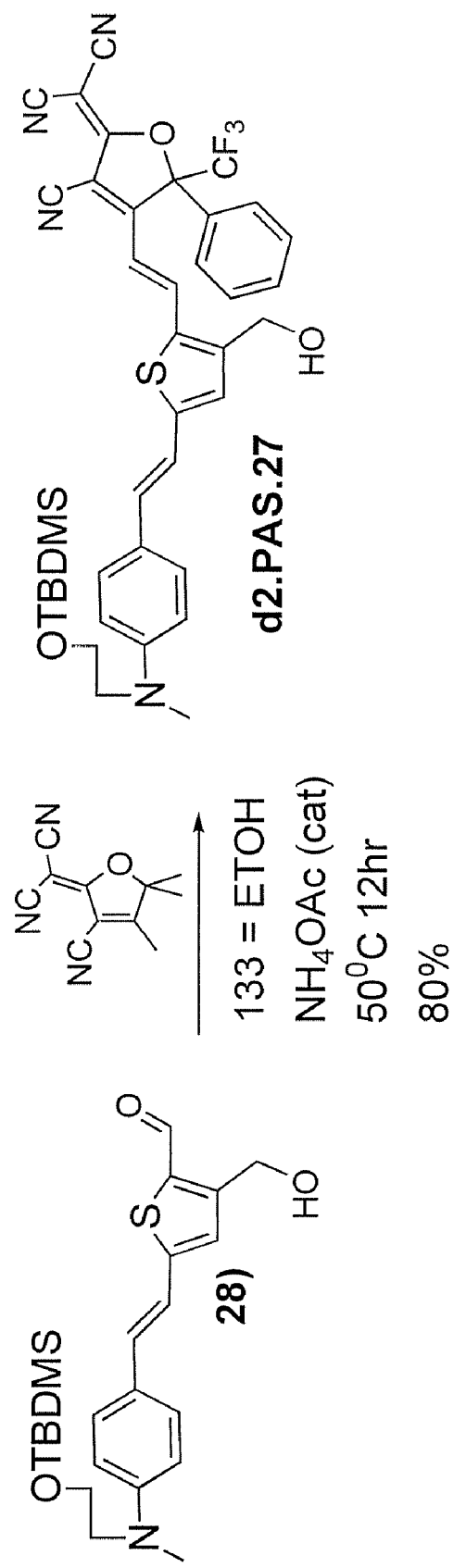
Figure 11:
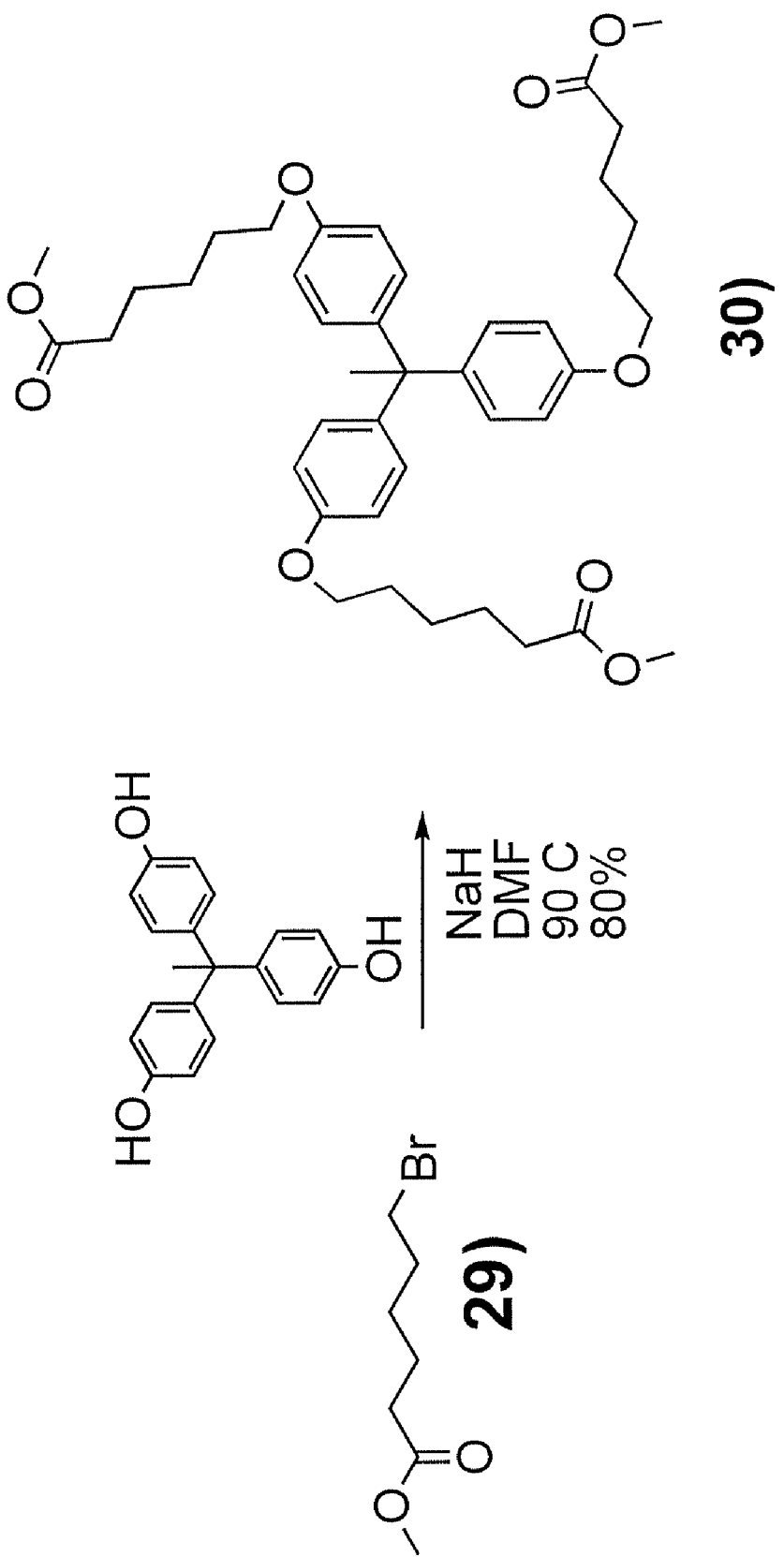
Figure 12:
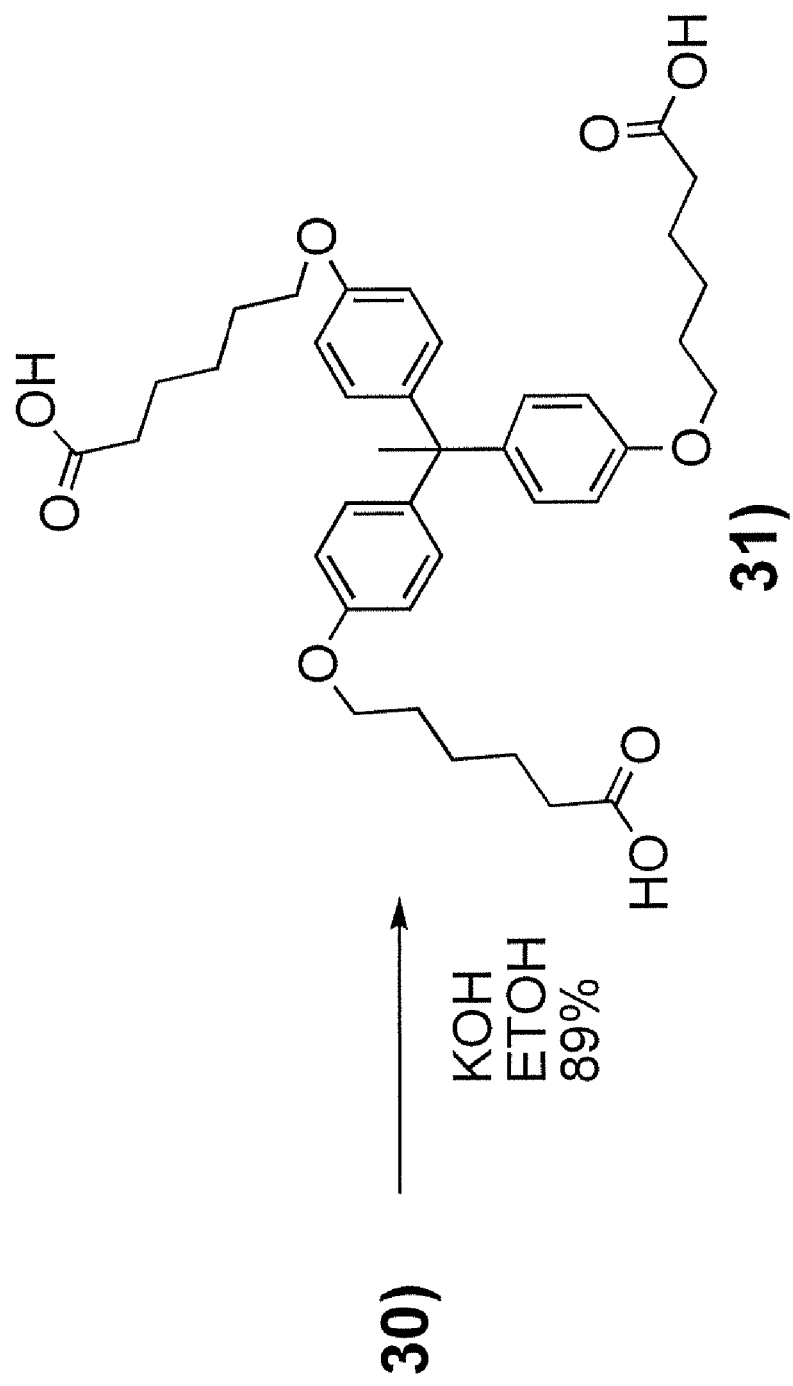
Figure 13:
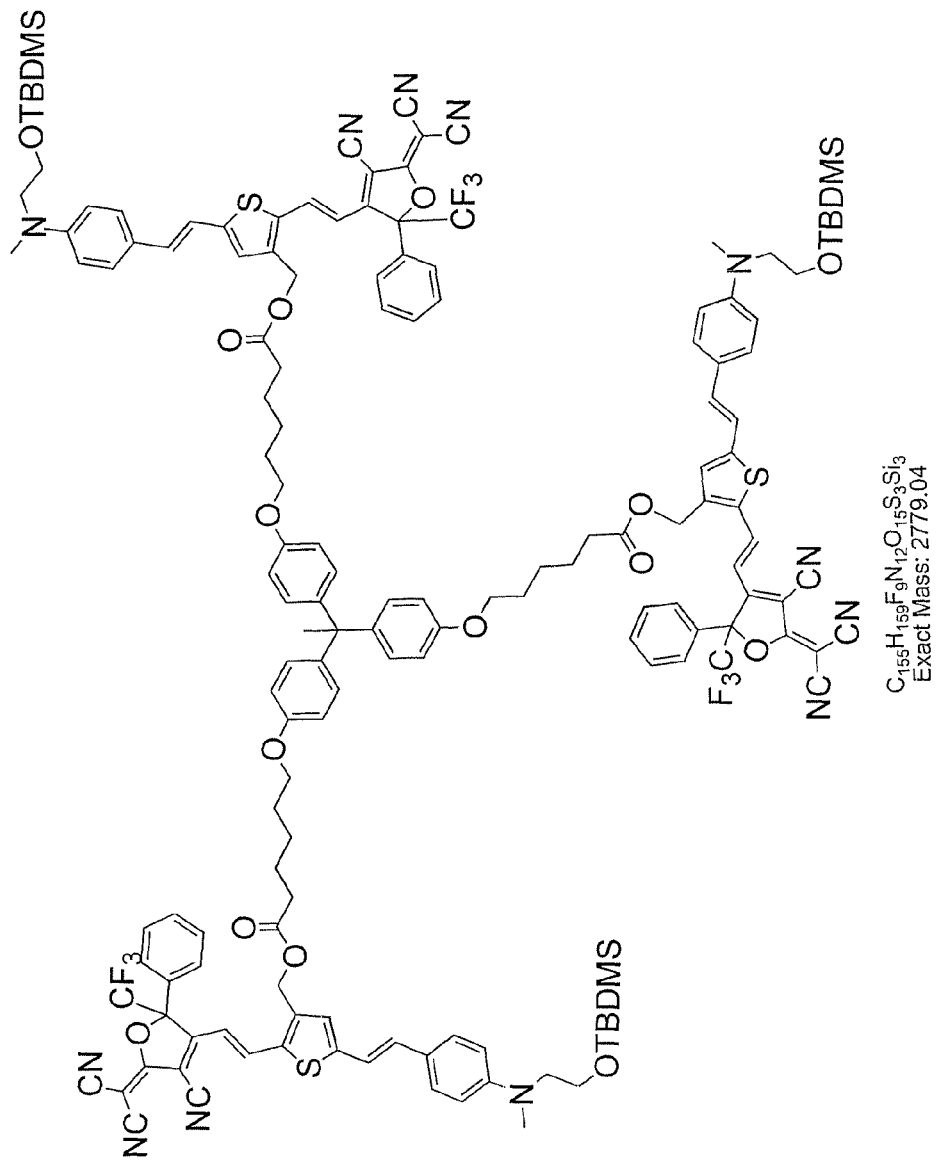
Figure 14:
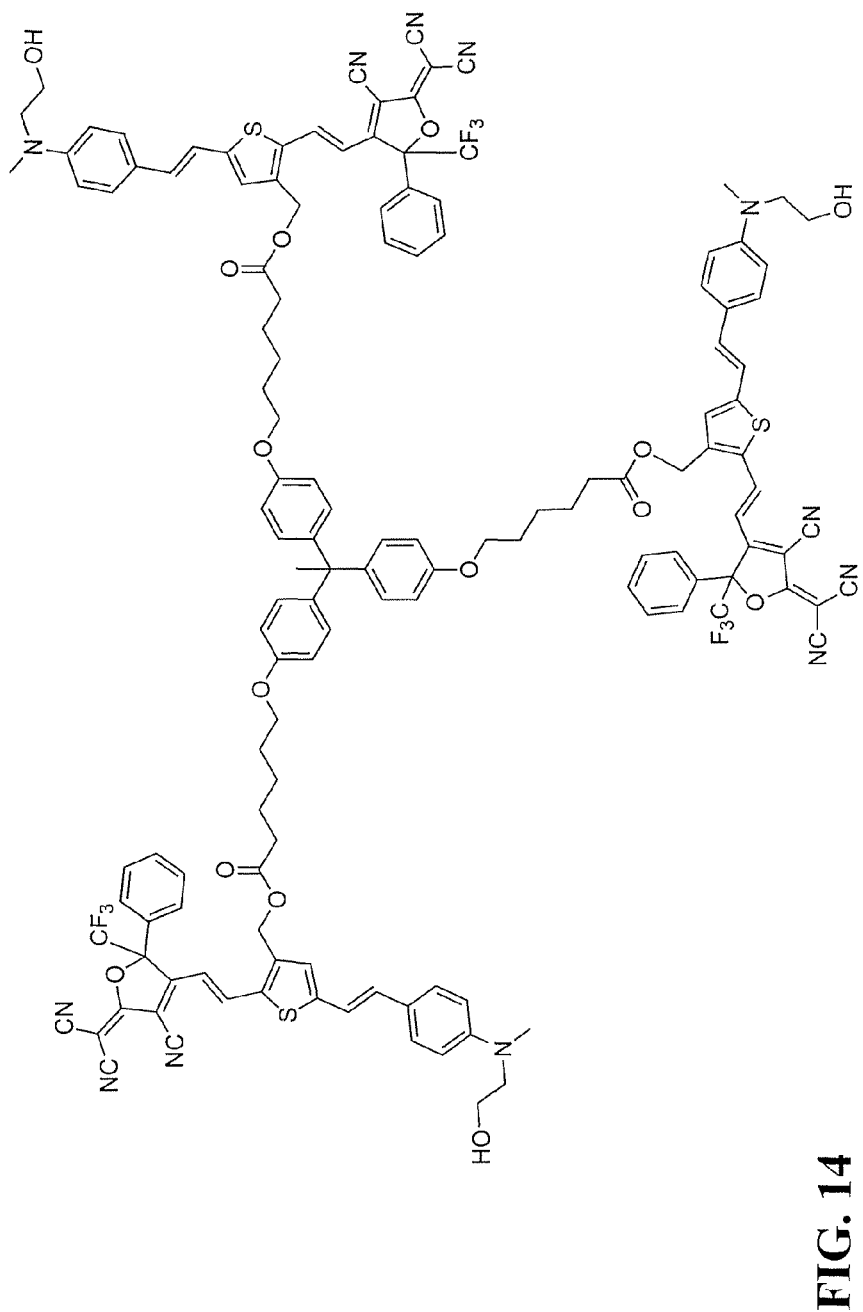

The preparation of a representative chromophore compound (AJC146) is described below and illustrated schematically in FIG. 5.

To 0.5 mL, of dry ethanol was added 0.161 g (0.270 mmol) of donor-bridge aldehyde and 0.108 g (0.272 mmol) of acceptor. The mixture was heated to 40° C. under nitrogen atmosphere for 2.5 hours. The crude product was purified through chromatography on silica gel with the eluent of 5-10% ethyl acetate in hexane to afford AJC146 as dark powder (0.191 g, yield: 73%), which was recrystallized in methanol twice prior to use.

$^1$H-NMR data (CDCl$_3$, TMS): δ=8.27 (d, 1H, CH=), 7.62 (d, 1H, thiopliene), 7.41 (d, 3H, phenylene and CH=), 7.29 (m, 1H para-phenylene), 6.96 (d, 1H, CH=), 6.83 (d, 1H, CH=), 6.72 (d, 2H, phenylene), 6.43 (d, 1H, thiophene), 6.38 (d, 1H, CH=), 3.80 (t, 4H, CH$_2$O), 3.59 (t, 4H, CH$_2$N), 2.41 (in, 4H, CH$_2$ of cyclohexylene), 1.03 (m, 6H, CH$_3$ on cyclohexylene), 0.90 (m, 18H, CH$_3$ of t-butyl), 0.04 (s, 12H, CH$_3$ of TBDMS). Glass transition temperature by DSC: $T_g$=65° C.

Example 4

The Preparation of a Representative Dendronized Chromophore Compound D2.pas.41

The preparation of a representative dendronized chromophore compound (D2.pas.41) (or PAS41) is described below and illustrated schematically in FIGS. 6-15.

{4-[2-(4-Bromo-thiophen-2-yl)-vinyl]-phenyl}-[2-(tert-butyl-dimethyl-silanyloxy)-ethyl]-methylamine (see FIG. 6): An oven dried, magnetically stinted, 250 mL round bottom flask (RBF) was charged with a solution of 23 (17.62 g, 56.27 mmol), and 24 (11.01 g, 37.51 mmol) in 100 mL freshly distilled THF. Potassium tert-butoxide (63.77 mL, 1.0M solution in THF) is added dropwise over 0.5 hr. The mixture was allowed to stir for 12 hrs and 100 mL, NaCl (sat) was added. The organic layer was separated and the aqueous layer was extracted with dichloromethane (DCM). The combined organics were dried over MgSO$_4$, filtered, and the solvent was removed in vacuo. The resulting crude product was then purified by silica gel column chromatography (5% EtOAc/Hex) to yield 15.1 g (90%) of a bright yellow solid.

$^1$H NMR (500 MHz, CDCl$_3$): δ 7.37 (d, j=9 Hz, 2H), 7.03 (d, j=1 Hz, 1H), 6.96 (d, j=15.5 Hz, 1H), 6.92 (d, j=2 Hz, 1H), 6.90 (d, j=15.5 Hz, 1H), 6.72 (d, j=9 Hz, 2H), 3.836 (t, j=6.5 Hz, 2H), 3.55 (t, j=6.4 Hz, 2H), 3.07 (s, 3H), 0.958 (s, 9H), 0.092 (s, 6H) ppm. $^{13}$C NMR (125 MHz, CDCl$_3$): δ 149.17, 145.01, 130.03, 127.84, 126.31, 124.15, 119.78, 115.94, 111.88, 110.03, 60.56, 54.74, 39.27, 25.98, 18.32, −5.29 ppm.

5-[2-(4-{[2-(tert-Butyl-dimethyl-silanyloxy)-ethyl]-methyl-amino}-phenyl)-vinyl]-thiophene-3-carbaldehyde (see FIG. 7): A solution of n-BuLi (1.6 M in hexanes) was titrated using 4-biphenyl methanol as the indicator and found to be 1.2 M. An oven dried, magnetically stirred 250 mL RBF was charged with 25 (5 g, 11.04 mmol). This was dissolved in 100 mL freshly distilled diethyl ether. The solution was then cooled to −78° C. (dry ice/acetone). Exactly 1 equivalent of n-BuLi (9.3 mL, 11.04 mmol) was added dropwise over 15 minutes. The reaction temp was raised slightly by addition of more acetone to the bath. The reaction was stirred for 10 minutes and then quenched with dry DMF (8.6 mL, 110.4 mmol) by dropwise addition. The cooling bath was removed for 10 minutes and then NH$_4$Cl (sat, 100 mL) was added. The organics were separated and the aqueous phase was extracted with EtOAc. The organics were then combined, dried over MgSO$_4$, and the solvent removed in vacuo. The crude product was purified by silica gel column chromatography (5% EtOAc/Hex) to yield 3.0 g (7.47 mmol, 67%) of a non-fluorescent, yellow, crystalline solid.

$^1$H NMR (500 MHz, CDCl$_3$): δ 9.84 (s, 1H), 7.89 (s, 1H), 7.36 (d, j=9 Hz, 2H), 7.35 (s, 1H), 6.98 (d, j=15.5 Hz, 1H), 6.91 (d, j=15.5 Hz, 1H), 6.70 (d, j=9 Hz, 2H), 3.81 (t, j=6 Hz, 2H), 3.53 (t, j=6 Hz, 2H), 3.05 (s, 3H), 0.92 (s, 9H), 0.06 (s, 6H) ppm. $^{13}$C NMR (125 MHz, CDCl$_3$): δ 184.99, 149.28, 146.04, 143.40, 134.69, 131.13, 127.89, 123.95, 121.02, 116.03, 111.85, 60.52, 54.69, 39.24, 25.93, 18.28, −5.34 ppm.

{5-[2-(4-{[2-(tert-Butyl-dimethyl-silanyloxy)-ethyl]-methyl-amino}-phenyl)-vinyl]-thiophen-3-yl}-methanol (see FIG. 8): A 250 mL, two-neck, magnetically-stirred, RBF was equipped with an addition funnel and charged with NaBH$_4$ (0.2 g, 5.28 mmol). An aqueous solution of NaOH (4 mL, 0.2 N) was then added and the mixture was cooled to 0° C. (ice bath). A solution of 26 (3.0 g, 7.47 mmol) dissolved in 1:1 THF/MeOH (40 mL) was then added dropwise. The reaction was stirred for 30 minutes and the cooling bath was removed. After 1 hour the reaction was quenched by the slow addition of NH$_4$Cl (sat). The organics were separated and the aqueous phase was extracted with EtOAc. The organics were then combined, dried of MgSO$_4$, and the solvent removed in vacuo. The reaction was quantitative by NMR and the product was used without further purification.

$^1$H NMR (300 MHz, CDCl$_3$): δ7.35 (d, j=9 Hz, 2H), 6.99 (m, 3H), 6.80 (d, j=16.2 Hz, 1H), 6.70 (d, j=9 Hz, 2H), 4.65 (s, 2H), 3.79 (t, j=6 Hz, 2H), 3.51 (t, j=6 Hz, 2H), 3.03 (s, 3H), 0.916 (s, 9H), 0.056 (s, 6H) ppm. $^{13}$C NMR (125 MHz, CDCl$_3$): δ 148.91, 144.85, 142.72, 129.02, 127.64, 124.77, 124.07, 119.44, 117.30, 111.96, 60.83, 60.56, 54.76, 39.25, 25.98, 18.32, −5.29 ppm.

5-[2-(4-{[2-(tert-Butyl-dimethyl-silanyloxy)-ethyl]-methyl-amino}-phenyl)-vinyl]-3-hydroxymethyl-thiophene-2-carbaldehyde (see FIG. 9): In a 250 mL, oven dried, magnetically stirred RBF, 27 (3.0 g, 7.47 mmol) was dissolved in freshly distilled THF (30 mL). The solution was then cooled to −78° C. (dry ice/acetone). n-BuLi (14.44 mL, 2.30 mmol, solution in hexanes) was then added dropwise over 15 minutes. After addition a light green color was observed. The mixture was allowed to stir for 1 hour and then quenched with dry DMF (1.74 mL, 22.41 mmol). The reaction was then allowed to warm to room temperature overnight. A saturated solution of NaCl (100 mL) was then added. The organics were separated and the aqueous phase was extracted with DCM. The organics were then combined, dried of MgSO$_4$, and the solvent removed in vacuo. The crude product was then purified by silica gel column chromatography (10% EtOAc/Hex) and then repurified, again by column (DCM) to yield 2.76 g (5.26 mmol, 70%) of a red, oily solid.

$^1$H NMR (500 MHz, CDCl$_3$): δ 9.75 (s, 1H), 7.39 (d, j=9 Hz, 2H), 7.12 (d, j=15.5 Hz, 1H), 7.08 (s, 1H), 6.97 (d, j=15.6 Hz), 6.70 (d, j=8 Hz, 2H), 4.86 (s, 2H), 3.81 (t, j=6 Hz, 2H), 3.54 (t, j=6 Hz, 2H), 3.07 (s, 3H), 0.91 (s, 9H), 0.06 (s, 6H) ppm.

2-[4-(2-{5-[2-(4-{[2-(tert-Butyl-dimethyl-silanyloxy)-ethyl]-methyl-amino}-phenyl)-vinyl]-3-hydroxymethyl-thiophen-2-yl}-vinyl)-3-cyano-5-phenyl-5-trifluoromethyl-5H-furan-2-ylidene]malononitrile (see FIG. 10): A magnetically stirred, 25 mL RBF was charged with 28 (1.00 g, 2.32 mmol), and 2-(3-cyano-4-methyl-5-phenyl-5-trifluoromethyl-5H-furan-2-ylidene)malononitrile (TCF) (0.767 g, 2.44 mmol). This mixture is then dissolved in 5 mL absolute ethanol. The reaction was heated to 50° C. overnight. The ethanol was removed in vacuo and the crude product was purified by silica gel column chromatography (10% EtOAc/ DCM) to provide d2.pas.27.

1,1,1-Tris[(6-hexanoic acid methyl ester)-4-phenyl]ethane (30) (see FIG. 11): An oven dried, magnetically stirred, 500 mL two-neck RBF was charged with 1,1,1-tris(4-hydroxyphenyl)ethane (3.62 g, 12.0 mmol), then placed under high vacuum for 30 min. The solid was dissolved in 150 mL dry DMF, and 6-bromohexanoic acid methyl ester (29) (10.0 g, 47.8 mmol) was added. After stirring at room temperature (RT) for 10 min, NaH (1.91 g (60% in oil), 47.8 mmol) was added and heated to 90° C. The reaction was stirred overnight, diluted with deionized (DI) water, and extracted with DCM. The organics were combined, dried over $MgSO_4$, and condensed in vacuo. The yellow oil was purified using a short silica gel column (5% EtOAc/Hexanes-20% EtOAc/Hexanes) to yield 6.64 g (80%) of a clear liquid (30).

$^1$H NMR (300 MHz, $CDCl_3$): δ 6.97 (d, 8.7 Hz, 6H), 6.75 (d, 8.7 Hz, 6H), 6.93 (t, 6.6 Hz, 6H), 3.66 (s, 9H), 2.34 (t, 7.5 Hz, 6H), 2.09 (s, 3H), 1.76 (m, 6H), 1.70 (m, 6H), 1.51 (m, 6H) ppm.

HRMS (ESI): exact mass calcd for $C_{41}H_{55}O_9$ $[M+H]^+$, 691.3846. Found, 691.3841.

1,1,1-Tris(6-hexanoic acid-4-phenyl)ethane (31) (see FIG. 12): A 250 ml RBF was charge with (30) and dissolved in 25 mL of 1N KOH in EtOH and 10 mL THF. After 24 hr at RT, 30 mL, of 1N KOH in water was added. After 24 hr, a solution of 1N HCl was added until pH about 6. The product was extracted with EtOAc, combined, dried over $MgSO_4$, and condensed in vacuo. A cream colored solid was purified by rinsing product with a small amount of DCM, to yield 5.56 g (89%) (31) as an ivory solid.

$^1$H NMR (300 MHz, $CDCl_3$): δ 6.96 (d, 8.7 Hz, 6H), 6.76 (d, 8.7 Hz, 6H), 3.94 (t, 6.3 Hz, 6H), 2.38 (t, 7.2 Hz, 6H), 2.09 (s, 3H), 1.78 (in, 6H), 1.70 (m, 6H), 1.52 (m, 6H) ppm.

HRMS (ESI): exact mass calcd for $C_{38}H_{49}O_9$ $[M+H]^+$, 649.3377. Found, 649.3366.

D2.pas.33 (see FIG. 13): An oven dried, magnetically stirred, 100 mL two-neck RBF was charged with (31) (0.221 g, 0.341 mmol), d2.pas.27 (0.820 g, 1.13 mmol), 1,3-dicyclohexylcarbodiimide (0.260 g, 1.26 mmol), and DPTS (0.10 g, 0.341 mmol). After 1 hr of drying under a high vacuum, the mixture was dissolved in freshly distilled THF (10 mL) and DCM (15 mL). The reaction was stirred for 48 hr, washed with NaCl (sat), and the organic layer collected. The aqueous layer was extracted with DCM, and the combined organics were washed with water, dried over $MgSO_4$, and condensed in vacuo. The dark blue crude solid was purified by silica gel column chromatography (5% THF/DCM) to yield 0.182 g (25%) d2.pas.33 as a deep blue solid.

MALDI-TOF: 2647.95

D2.pas.40 (see FIG. 14): A 50 mL, RBF is charged with d2.pas.33 (0.19 g) and acetone was added to dissolve (4 mL). 1N HCl (0.5 mL) was then added. The reaction was allowed to proceed for 2.5 hr. The mixture was then neutralized with $NaHCO_3$ and the product collected by filtration. The blue solid was obtained in quantitative yield and used without further purification.

D2.pas.41 (see FIG. 15): An oven dried, magnetically stirred, 100 mL two-neck RBF was charged with d2.pas.40 (0.10 g, 0.041 mmol), dendron 1 (0.084 g, 0.164 mmol), 1,3-dicyclohexylcarbodiimide (0.038 g, 0.184 mmol), and DPTS (0.030 g, 0.20 mmol). After 1 hr of drying under a high vacuum, the mixture was dissolved in freshly distilled THF (10 mL) and DCM (15 mL). The reaction was stirred for 48 hr, washed with NaCl (sat), and the organic layer collected. The aqueous layer was extracted with DCM, and the combined organics were washed with water, dried over $MgSO_4$, and condensed in vacuo. The dark blue crude solid was purified by silica gel column chromatography (2.5% THF/DCM) to yield 0.1 g of d2.pas.41 as a deep blue solid.

MALDI-TOF: 3295.83

$^1$H NMR ($CDC_{13}$, 500 MHz) confirmed the structure of the multi-armed fluorinated dendrimer PAS41.

Example 5

The Preparation of a Representative Dendronized Multi-Chromophore Compounds: D3-AJT and D4-AJT Multi-chromophore compounds D3-AJT, illustrated in FIG. 17A, and D4-AJT, illustrated in FIG. 17B were synthesized according to the following procedure, illustrated in FIG. 16

D3-AJT. To a solution of AJT-OH (1.00 g, 0.94 mmol), D3-COOH (0.20 g, 0.28 mmol), and dimethylaminopyridine (DMAP) (0.05 g, 0.40 mmol) in 10 mL, of THF was added 1-[3-(dimethylamino)propyl]-3-ethylcarbodiimide (DEC) (0.20 g, 1.29 mmol). The reaction mixture was allowed to stir at room temperature overnight under nitrogen atmosphere. After filtration of the resultant urea, all solvent was evaporated under reduced pressure. The crude product was purified by column chromatography using ethyl acetate as an eluent to afford D3-AJT as blue-greenish solid (0.75 g, 70%). $T_g$=116° C., r33=79 pm/V at 100 V/µm. D3-AJT has 40 wt % active chromophore content and a molecular weight of 3843 g/mol.

D4-AJT was synthesized and purified with a similar procedure as described for D3-AJT: 0.23 g (0.21 mmol) of D4-COOH to afford D4-AJT (0.71 g, 65%). $T_g$=123° C., r33=83 pm/V at 100 V/µm. D4-AJT has 39 wt % active chromophore contents and a molecular weight of 5330 g/mol.

D3-COOH was prepared according to the methods described in H. Ma, B. Chen, T. Sassa, L. R. Dalton, A. K-Y. Jen, 2001, *J. Am. Chem. Soc.*, 123, 986. D4-COOH was prepared according to the methods described in H. Ma, S. Liu, J. Luo, S. Suresh, L. Liu, S. H. Kang, M. Haller, T. Sassa, L. R. Dalton, A. K-Y. Jen, 2002, *Adv. Func. Mater.*, 12, 565. AJT-OH was prepared according to the methods described in T.-D. Kim, J. Luo, Y. Tian, J.-W. Ka, N. M. Tucker, M. Haller, J.-W. Kang, and A. K.-Y. Jen, 2006, *Macromolecules*, 39, 1676.

Example 6

Figure 21:
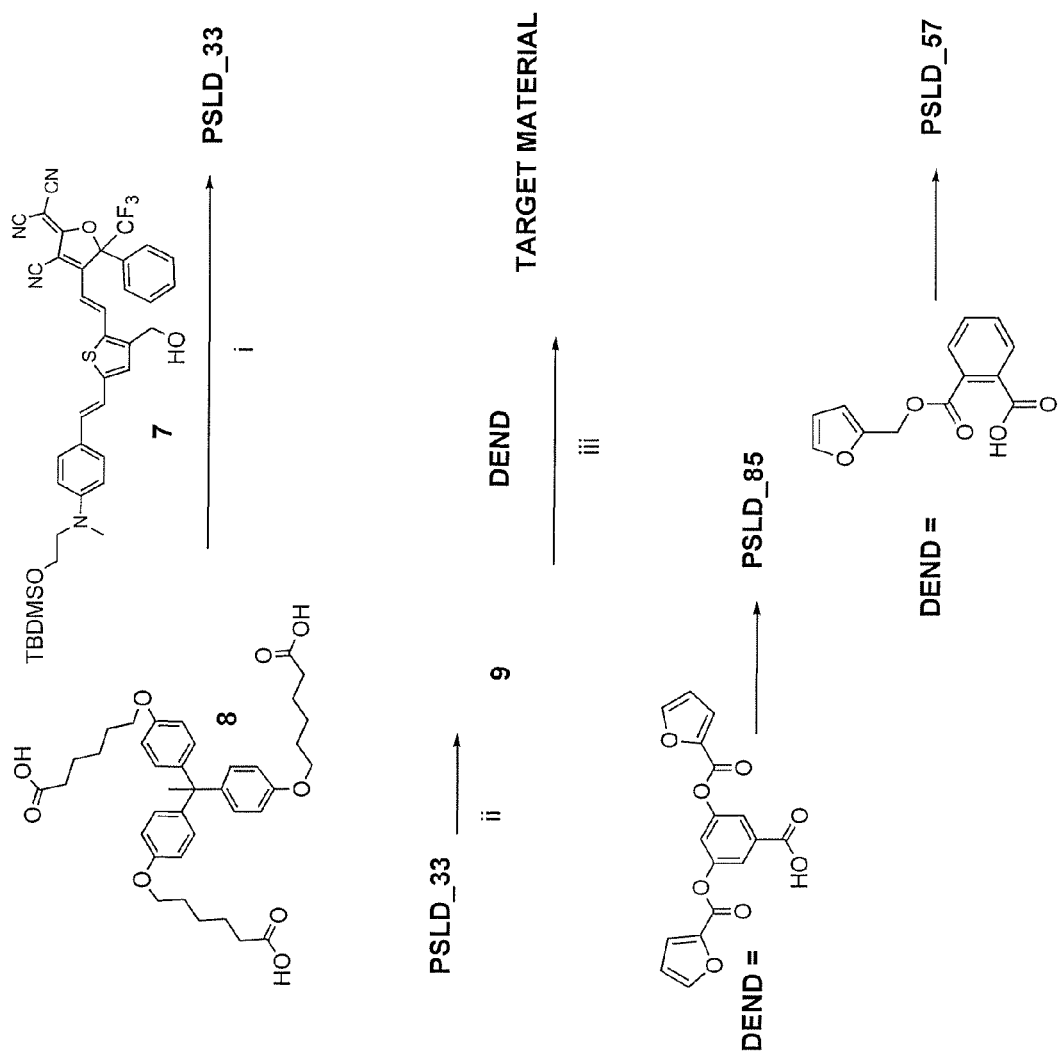
FIG. 21 illustrates the synthesis of a representative dendronized chromophore compound useful in the composite of the invention.

The Preparation of Representative Multi-Chromophore Dendrimers with Diene Groups for Diels-Alder Bond Formation The reaction mechanism is illustrated in FIG. 21. The reaction conditions for each step are as follows: i) DCC/DPTS, DCM:DMF, reflux 48 hrs, 50%; ii) 1N HCl (MeOH solution), acetone, RT 2.5 hrs, quant.; iii) DCC/DPTS, DCM:DMF, reflux 48 hrs, 62%.

The tri-acid dendrimer core 8 and 7 were prepared according to literature method described in: Sullivan, P. A.; Alkelaitis, A. J. P.; K., L. S.; McGrew, G.; Lee, S. K.; Choi, D. H.; Dalton, L. R., Novel Dendritic Chromophores for Electro-optics: Influence of Binding Mode and Attachment Flexibility on Electro-Optic Behavior. *Chem. Mater.* 2006, 18, 344-351.

PSLD_33: An oven dried, magnetically-stirred, 100 mL, two-neck RBF was charged with 8 (0.221 g, 0.341 mmol), 7 (0.820 g, 1.13 mmol), 1,3-dicyclohexylcarbodiimide (0.260 g, 1.26 mmol), and DPTS (0.10 g, 0.341 mmol). After 1 hr of drying under a high vacuum, the mixture was dissolved in freshly distilled THF (10 mL) and DCM (15 mL). The reaction was stirred for 48 hr, washed with NaCl (sat.), and the organic layer collected. The aqueous layer was extracted with DCM, and the combined organics were washed with water, dried over MgSO$_4$, and condensed in vacuo. The dark blue crude solid was purified by silica gel column chromatography (5% THF/DCM) to yield 0.182 g (25%) of a deep blue solid. $T_g$=96° C., $\lambda_{max}$=759 nm (CHCl$_3$)

$^1$H NMR (300 MHz, CDCl$_3$): δ 7.89 (J=15.3 Hz), 7.58-7.54 (m, 15H), 7.39 (d, J=9 Hz, 6H), 7.13 (d, J=15.9 Hz, 3H), 7.03 (s, 3H), 6.98, (d, J=8.7 Hz, 6H), 6.96 (d, J=15.9 Hz, 3H), 6.77 (d, J=8.7 Hz, 6H), 6.68 (d, J=8.7 Hz, 6H), 6.64 (d, J=15.3 Hz, 3H), 4.92 (d, J=3 Hz, 6H), 3.94 (t, J=6.3 Hz, 6H), 3.81 (t, J=6 Hz, 6H), 3.56 (t, J=6 Hz, 6H), 3.10 (s, 9H), 2.35 (t, J=7.2 Hz, 6H), 2.09 (br-s, 3H), 1.87-1.79 (m, 6H), 1.72-1.67 (m, 6H), 1.55-1.49 (m, 6H), 0.89 (s, 27H), 0.03 (s, 18H), ppm. MALDI-TOF: [M+Na], 2804.476 (m/z), elemental analysis (CHN) calculated for C$_{155}$H$_{159}$F$_9$N$_{12}$O$_{15}$S$_3$Si$_3$; C, 66.93; H, 5.76; N, 6.04%. Found; C, 67.92; H, 5.96; N, 5.89%, $\lambda_{max}$ (CHCl$_3$)=759 nm; $\lambda_{max}$ (flm)=734 nm, $T_g$=85° C.

PSLD_40 (9): A 50 mL RBF is charged with d2.pas.33 (0.19 g) and acetone was added to dissolve (4 mL). 1N HCl (0.5 mL) was then added. The reaction was allowed to proceed for 2.5 hr. The mixture was then neutralized with NaHCO$_3$ and the product collected by filtration. The blue solid was obtained in quantitative yield and used without further purification.

General procedure for the preparation of PSLD_85, illustrated in FIG. 20A, and PSLD_57, illustrated in FIG. 19A: An oven dried, stirred, 100 mL, two-neck RBF was charged with 9 (d2.pas.40) (0.10 g, 0.041 mmol), dendron DEND, as illustrated in FIG. 21, (0.164 mmol), 1,3-dicyclohexylcarbodiimide (0.038 g, 0.184 mmol), and DPTS (0.030 g, 0.20 mmol). After 1 hr of drying under a high vacuum, the mixture was dissolved in freshly distilled THF (10 mL) and DCM (15 mL). The reaction was stirred for 48 hr, washed with NaCl (sat.), and the organic layer collected. The aqueous layer was extracted with DCM, and the combined organics were washed with water, dried over MgSO$_4$, and condensed in vacuo. The dark blue crude solid was purified by silica gel column chromatography (2.5% THF/DCM) to yield 0.1 g (0.025 mmol, 62%), of a deep blue solid.

PSLD_85: $^1$H NMR (300 MHz, CDCl$_3$): δ 8.20 (q, J=1 Hz, 4H), 7.89 (d, J=15 Hz, 3H), 7.71 (d, J=2.4 Hz, 6H), 7.56 (m, 15H), 7.52 (t, J=1.5 Hz, 6H), 7.37 (d, J=8.8 Hz, 6H), 7.34 (t, J=2.1 Hz, 3H), 7.04 (d, J=15.5 Hz, 3H), 7.01 (s, 3H), 6.97 (d, J=8.8 Hz, 6H), 6.91 (d, 15 Hz), 6.87 (m, 6H), 6.78 (d, J=8.8 Hz, 6H), 6.75 (d, J=8.8 Hz, 6H), 6.65 (d, J=15 Hz, 3H), 4.92 (d, J=3.3 Hz, 6H), 4.51 (t, J=5.4 Hz, 6H), 3.93 (t, J=6.3 Hz, 6H), 3.82 (t, J=5.4 Hz, 6H), 3.12 (s, 9H), 2.35 (t, J=7.2 Hz, 6H), 2.09 (s, 3H), 1.87 (m, 6H), 1.82 (m, 6H), 1.65 (in, 6H) ppm, HRMS (MALDI-TOF): found, 3413.969 (M+H), EA (CHN) analysis calcd for C$_{188}$H$_{141}$F$_9$N$_{12}$O$_{36}$S$_3$; C, 66.19; H, 4.17; N, 4.93; Found, C, 65.68; H, 4.21; N, 4.15%, $\lambda_{max}$=725 nm (CHCl$_3$).

PSLD 57: $^1$H NMR (300 MHz, CDCl$_3$): δ 7.88 (d, J=15.3, 3H), 7.77 (m, 3H), 7.56 (m, 21H), 7.39 (m, 12H), 7.12 (d, J=15.5 Hz, 3H), 6.99 (m, 12H), 6.76 (m, 12H), 6.64 (d, J=15.5 Hz, 3H), 6.48 (s, 6H), 5.2 (s, 6H), 4.92 (dd, J$_1$=13.5 Hz, J$_2$=2.4 Hz, 6.02), 4.43 (t, J=5.7 Hz, 6H), 3.94 (t, J=6 Hz, 6H), 3.74 (t, J=5.4, 6H), 3.07 (s, 9H), 2.35 (t, J=7.2 Hz, 6H), 2.09 (s, 3H), 1.79 (m, 6H), 1.69 (m, 6H), 1.52 (m, 6H) ppm, EA (CHN) analysis calcd for C$_{176}$H$_{141}$F$_9$N$_{12}$O$_{27}$S$_3$, C, 67.68; H, 4.55; N, 5.38; Found, C, 65.68; H, 4.67; N, 4.85%

Example 7

The Preparation of Representative Chromophore Molecules with Protected Dienophile Groups for Diels-Alder Bond Formation

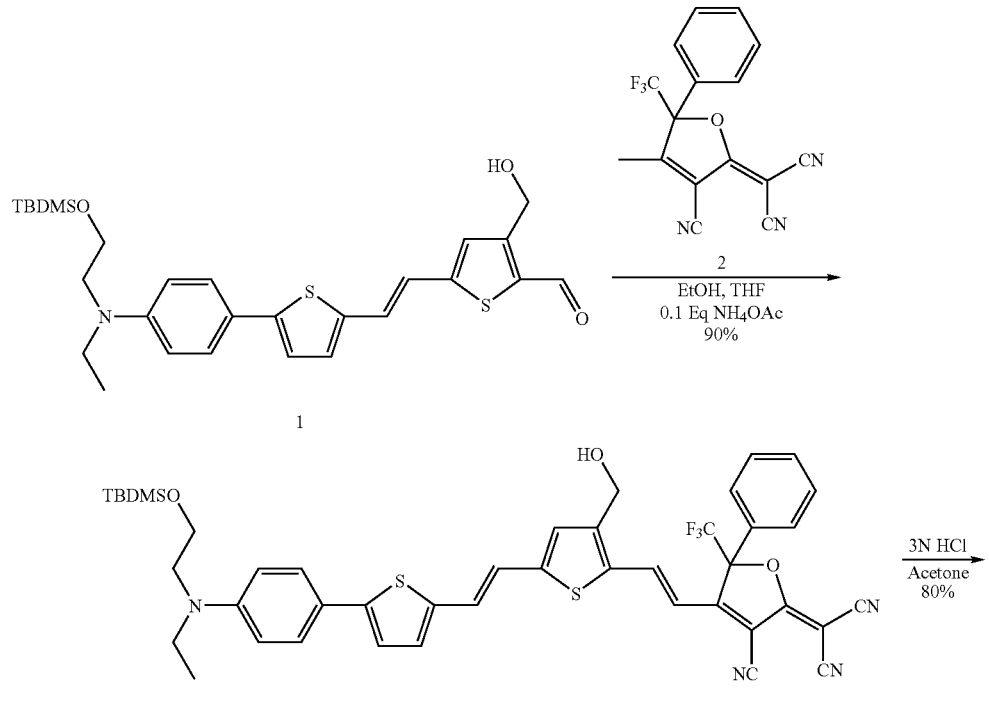

AALD-1164

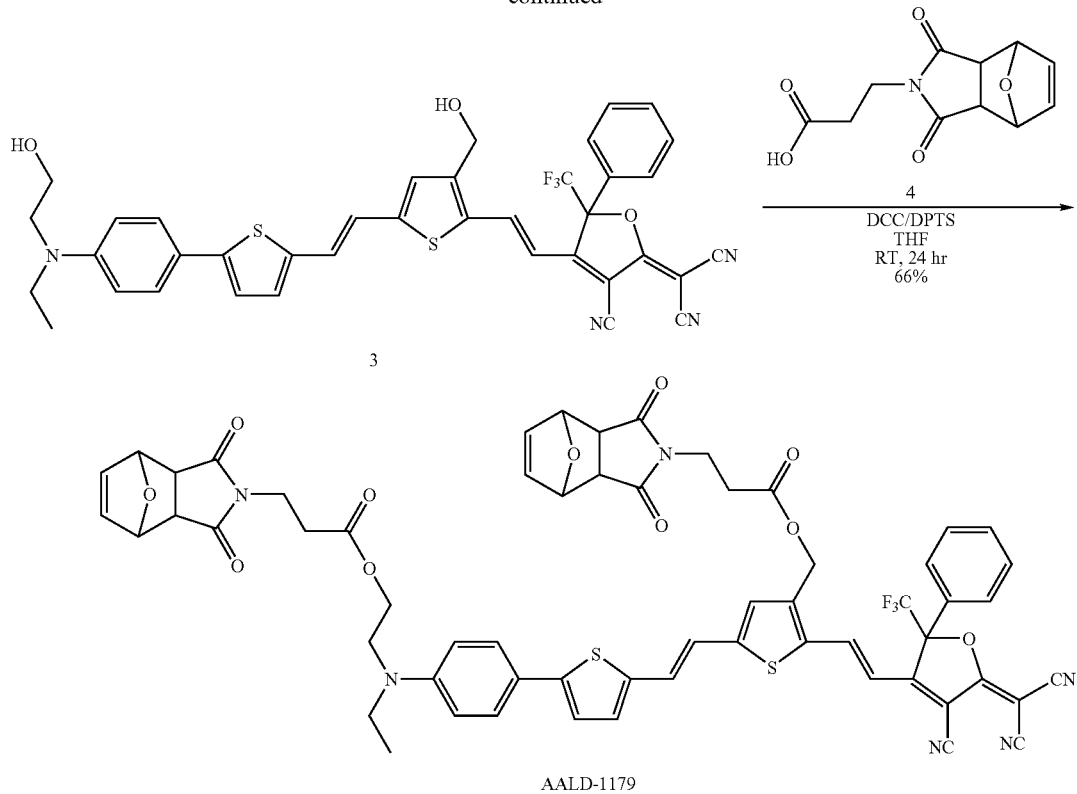

AALD-1179

Mono-hydroxyl Functionalized Chromophore (AALD 1164). An oven-dried, 1000 mL, 1-neck, stirred RBF was charged with 5-{2-[5-(4-{[2-(tert-butyl-dimethyl-silanyloxy)-ethyl]-ethyl-amino}-phenyl)-thiophen-2-yl]-vinyl}-3-hydroxymethyl thiophene-2-carbaldehyde (1) (6.94 g, 0.013 mmol). The vessel was dried for 2 hr under vacuum, at which time 2-(3-Cyano-4-methyl-5-phenyl-5-trifluoromethyl-5H-furan-2-ylidene)-malononitrile (2) (5.33 g, 0.0169 mmol) was added and dried under vacuum for 30 min. The mixture was then dissolved in freshly distilled THF (30 mL) and to this was added NH$_4$OAc (0.1 g, 0.0013 mmol, cat.). The solution was diluted with ethanol (120 mL), and again after 1.5 hr with freshly distilled THF (130 mL) and ethanol (160 mL). The reaction proceeded overnight, at which time the solution was condensed in vacuo. The mixture was filtered and the solid washed extensively with ethanol. The filtrate was condensed in vacuo and the crude product was purified via silica gel column chromatography (3% EtOH/DCM) to give a total yield 9.76 g (90%) of a dark purple flaky solid.

$^1$H-NMR (300 MHz, CDCl$_3$): δ 8.16 (d, 15.9 Hz, 1H), 7.51 (m, 11H), 7.11 (d, 15.9 Hz, 1H), 6.80 (d, 8.7 Hz, 2H), 6.68 (d, 15.9 Hz, 1H), 4.61 (m, 2H), 3.86 (t, 6.3 Hz, 2H), 3.55 (m, 4H), 1.19 (t, 6.9 Hz, 3H), 0.91 (s, 9H), 0.68 (s, 6H).

HRMS (ESI): exact mass calcd for $C_{44}H_{43}F_3N_4O_3S_2Si$ [M+H]$^+$, 825.25. Found, 825.2560.

Di-hydroxyl Functionalized Chromophore (3). In a 100 mL RBF with mag. stirred AALD-1164 (1.5 g, 1.81 mmol) was added and dissolve in acetone (30 mL). To this was added a solution of HCl (10 mL, 3M). The reaction ran overnight, then neutralized using NaHCO$_3$ (sat). The mixture was partially condensed in vacuo, then filtered and washed with water, then with methanol. The reaction was afforded 1.03 g (80%) of a dark blue flaky solid and was used without further purification. λ$_{max}$(CHCl$_3$)=728 nm.

$^1$H-NMR (300 MHz, CDCl$_3$): δ 8.13 (d, 15 Hz, 1H), 7.20 (m, 1H), 6.89 (d, 15.6 Hz, 1H), 6.78 (d, 9 Hz, 2H), 6.61 (d, 15.6 Hz, 1H), 4.65 (s, 2H), 3.86 (t, 6 Hz, 2H), 3.53 (m, 4H), 1.22 (t, 6.9 Hz, 3H).

HRMS (ESI): exact mass calcd for $C_{38}H_{29}F_3N_4O_3S_2$ [M+H]$^+$, 711.16. Found, 711.1682.

Furan-Protected Maleimide Dendronized Chromophore AALD-1179. An oven-dried, 100 mL, 1-neck, mag.-stirred RBF was charged with 3 (1.04 g, 1.46 mmol), furan-protected malimide propanoic acid (4) (0.98 g, 4.10 mmol), 1,3-dicyclohexylcarbodiimide (0.90 g, 4.38 mmol), and DPTS (0.430 g, 1.46 mmol). After 30 min of drying in vacuo, the mixture was dissolved in dry DMF (2 mL) and freshly distilled DCM (40 mL) and stirred for 20 min at 40° C. Freshly distilled THF (5 mL) was added for solubility, and then the reaction proceeded overnight at 40-50° C. The reaction was then diluted with DCM and neutralized with brine. The organics were separated and the aqueous phase was extracted with DCM. The combined organics were washed with distilled water, dried over MgSO$_4$, filtered, and the solvent removed in vacuo. The crude product was purified via silica gel column chromatography (5% THF/DCM ramped to 10% THF/DCM) and then recrystallized from DCM in ethanol to afford 1.11 g (66%) of a dark blue flaky solid. λ$_{max}$(CHCl$_3$)=737 nm.

HRMS (ESI): exact mass calcd for $C_{60}H_{49}F_3N_6O_{11}S_2$ [M+H]$^+$, 1150.29. Found, 1150.2879.

While illustrative embodiments have been illustrated and described, it will be appreciated that various changes can be made therein without departing from the spirit and scope of the invention.

The embodiments of the invention in which an exclusive property or privilege is claimed are defined as follows:

1. A composite, comprising:
   (a) a chromophore compound having a π-electron donor group electronically conjugated to a π-electron acceptor group through π-electron bridge group, the compound having the formula:

$D_1\text{-}\pi_1\text{-}B_1\text{-}\pi_2\text{-}A_1$ wherein $D_1$ is a π-electron donor group, $B_1$ is a π-electron bridge group, $A_1$ is a π-electron acceptor group, $\pi_1$ is a π bridge electronically conjugating $D_1$ to $B_1$, $\pi_2$ is a π bridge electronically conjugating $B_1$ to $A_1$, wherein $\pi_1$ and $\pi_2$ may each be present or absent; and
   (b) a dendronized chromophore compound having a π-electron donor group electronically conjugated to a π-electron acceptor group through π-electron bridge group, the compound having the formula:

$D_2\text{-}\pi_3\text{-}B_2\text{-}\pi_4\text{-}A_2$ wherein $D_2$ is a π-electron donor group, $B_2$ is a π-electron bridge group, $A_2$ is a π-electron acceptor group, $\pi_3$ is a π bridge electronically conjugating $D_2$ to $B_2$, $\pi_3$ is a π bridge electronically conjugating $B_2$ to $A_2$, wherein $\pi_3$ and $\pi_4$ may each be present or absent, wherein one or more of the donor, bridge, or acceptor groups is substituted with a dendron;
   and wherein $D_1$ and $D_2$ are the same or different, $B_1$ and $B_2$ are the same or different, $A_1$ and $A_2$ are the same or different, and $\pi_1$, $\pi_2$, $\pi_3$, and $\pi_4$ are the same or different.

2. The composite of claim 1, wherein the dendronized chromophore comprises a donor group substituted with a dendron.

3. The composite of claim 1, wherein the dendronized chromophore comprises a multi-chromophoric dendrimer.

4. The composite of claim 3, wherein the multi-chromophoric dendrimer comprises two chromophoric groups.

5. The composite of claim 3, wherein the multi-chromophoric dendrimer comprises three chromophoric groups.

6. The composite of claim 1, wherein the chromophore compound is present in an amount from about 10 to about 90 weight percent.

7. The composite of claim 1 having an $r_{33}$ value from about 50 to about 330 pm/V at 1.3 μm.

8. The composite of claim 7, wherein the composite retains about 90% of its $r_{33}$ value after storage at room temperature for 500 hours.

9. The composite of claim 1, wherein the dendronized chromophore comprises a bridge group substituted with a dendron.

10. The composite of claim 1, wherein the dendronized chromophore comprises a donor group and a bridge group each substituted with a dendron.

11. An electro-optic device, comprising a composite comprising:
    (a) a chromophore compound having a π-electron donor group electronically conjugated to a π-electron acceptor group through π-electron bridge group, the compound having the formula:

$D_1\text{-}\pi_1\text{-}B_1\text{-}\pi_2\text{-}A_1$ wherein $D_1$ is a π-electron donor group, $B_1$ is a π-electron bridge group, $A_1$ is a π-electron acceptor group, $\pi_1$ is a π bridge electronically conjugating $D_1$ to $B_1$, $\pi_2$ is a π bridge electronically conjugating $B_1$ to $A_1$, wherein $\pi_1$ and $\pi_2$ may each be present or absent; and
    (b) a dendronized chromophore compound having a π-electron donor group electronically conjugated to a π-electron acceptor group through π-electron bridge group, the compound having the formula:

$D_2\text{-}\pi_3\text{-}B_2\text{-}\pi_4\text{-}A_2$ wherein $D_2$ is a π-electron donor group, $B_2$ is a π-electron bridge group, $A_2$ is a π-electron acceptor group, $\pi_3$ is a π bridge electronically conjugating $D_2$ to $B_2$, $\pi_3$ is a π bridge electronically conjugating $B_2$ to $A_2$, wherein $\pi_3$ and $\pi_4$ may each be present or absent, wherein one or more of the donor, bridge, or acceptor groups is substituted with a dendron;
    and wherein $D_1$ and $D_2$ are the same or different, $B_1$ and $B_2$ are the same or different, $A_1$ and $A_2$ are the same or different, and $\pi_1$, $\pi_2$, $\pi_3$, and $\pi_4$ are the same or different.

12. The electro-optic device of claim 11, wherein the dendronized chromophore compound is covalently coupled to the chromophore compound.

* * * * *

UNITED STATES PATENT AND TRADEMARK OFFICE
CERTIFICATE OF CORRECTION

PATENT NO. : 7,749,408 B2  
APPLICATION NO. : 11/462339  
DATED : July 6, 2010  
INVENTOR(S) : Jen et al.

Page 1 of 1

It is certified that error appears in the above-identified patent and that said Letters Patent is hereby corrected as shown below:

| COLUMN | LINE | ERROR |
|---|---|---|
| 29 (Claim 1, | 6 line 4) | "through π-electron bridge group," should read --through a π-electron bridge group,-- |
| 29 (Claim 1, | 17 line 14) | "through π-electron bridge group," should read --through a π-electron bridge group,-- |
| 30 (Claim 11, | 14 line 5) | "through π-electron bridge group," should read --through a π-electron bridge group,-- |
| 30 (Claim 11, | 25 line 15) | "through π-electron bridge group," should read --through a π-electron bridge group,-- |

Signed and Sealed this  
Twenty-first Day of June, 2011

David J. Kappos  
*Director of the United States Patent and Trademark Office*